United States Patent
Busey et al.

(10) Patent No.: US 11,710,194 B2
(45) Date of Patent: Jul. 25, 2023

(54) SYSTEMS, MEDIA, AND METHODS FOR AUTOMATED RESPONSE TO QUERIES MADE BY INTERACTIVE ELECTRONIC CHAT

(71) Applicant: LIVEPERSON, INC., New York, NY (US)

(72) Inventors: Andrew Thomas Busey, Austin, TX (US); Anthony Dan Chen, Austin, TX (US); Isao Uchida Jonas, Austin, TX (US); Douglas James Daniels, Jr., Austin, TX (US); Benjamin Edward Lamm, Dallas, TX (US)

(73) Assignee: LIVEPERSON, INC., New York, NY (US)

( * ) Notice: Subject to any disclaimer, the term of this patent is extended or adjusted under 35 U.S.C. 154(b) by 151 days.

(21) Appl. No.: 15/691,626

(22) Filed: Aug. 30, 2017

(65) Prior Publication Data

US 2017/0364593 A1    Dec. 21, 2017

Related U.S. Application Data

(63) Continuation of application No. 15/582,209, filed on Apr. 28, 2017, now Pat. No. 9,785,715.
(Continued)

(51) Int. Cl.
*G06Q 50/00* (2012.01)
*G06N 20/00* (2019.01)
(Continued)

(52) U.S. Cl.
CPC ........... *G06Q 50/01* (2013.01); *G06N 5/01* (2023.01); *G06N 5/02* (2013.01); *G06N 20/00* (2019.01)

(58) Field of Classification Search
CPC .......... G06Q 50/01; G06N 20/00; G06N 5/02; G06N 5/003; G06N 5/01
(Continued)

(56) References Cited

U.S. PATENT DOCUMENTS 6,006,225 A    12/1999   Bowman et al.
6,169,986 B1 *  1/2001   Bowman ............. G06F 16/3325
(Continued)

FOREIGN PATENT DOCUMENTS

WO    WO 2014/070467 A1 *  5/2014    ............. G06Q 30/00

OTHER PUBLICATIONS

Quarteroni, Silvia, et al., "Designing an Interactive Open-Domain Question Answering System", Natural Language Engineering, vol. 1, Issue 1, © 2008 Cambridge University Press, 23 pages.*
(Continued)

*Primary Examiner* — Robert Stevens
(74) *Attorney, Agent, or Firm* — Polsinelli LLP

(57) ABSTRACT

Systems, media, and methods for automated response to social queries comprising: monitoring queries from users, each query submitted to a vendor via an interactive chat feature of an external electronic communication platform, monitoring human responses to the queries, monitoring subsequent communications conducted via the electronic communication platform until each query is resolved; applying a first machine learning algorithm to the monitored communications to identify a query susceptible to response automation; applying a second machine learning algorithm to the query susceptible to response automation to identify one or more responses likely to resolve the query; and either i) notifying a human to respond to the query susceptible to response automation with the one or more responses likely to resolve the query, or ii) instantiating an autonomous software agent configured to respond to the query suscep-
(Continued)

tible to response automation with the one or more responses likely to resolve the query.

24 Claims, 25 Drawing Sheets

Related U.S. Application Data

(60) Provisional application No. 62/329,582, filed on Apr. 29, 2016.

(51) Int. Cl.
*G06N 5/02* (2023.01)
*G06N 5/01* (2023.01)

(58) Field of Classification Search
USPC .......................................................... 707/706
See application file for complete search history.

(56) References Cited

U.S. PATENT DOCUMENTS

| | | | | |
|---|---|---|---|---|
| 6,665,640 | B1* | 12/2003 | Bennett | G09B 5/04 704/257 |
| 6,842,877 | B2 | 1/2005 | Robarts et al. | |
| 8,291,319 | B2* | 10/2012 | Li | G06F 16/951 715/709 |
| 8,498,974 | B1* | 7/2013 | Kim | G06F 16/9535 707/706 |
| 8,782,249 | B1 | 7/2014 | Hood et al. | |
| 9,177,319 | B1 | 11/2015 | Chheda | |
| 10,607,150 | B2* | 3/2020 | Sainani | H04L 41/20 |
| 2005/0027664 | A1 | 2/2005 | Johnson et al. | |
| 2005/0125370 | A1 | 6/2005 | Brennan et al. | |
| 2006/0224554 | A1 | 10/2006 | Bailey et al. | |
| 2007/0244980 | A1 | 10/2007 | Baker, III | |
| 2008/0005075 | A1* | 1/2008 | Horvitz | G06F 16/951 |
| 2009/0119234 | A1* | 5/2009 | Pinckney | G06N 20/00 706/12 |
| 2009/0287680 | A1* | 11/2009 | Paek | G06F 16/3322 |
| 2011/0055699 | A1* | 3/2011 | Li | G06F 16/951 715/709 |
| 2012/0130771 | A1* | 5/2012 | Kannan | G06Q 10/06398 705/7.32 |
| 2013/0007055 | A1* | 1/2013 | Brown | G06F 16/3344 707/769 |
| 2013/0086024 | A1* | 4/2013 | Liu | G06F 16/951 707/706 |
| 2013/0282595 | A1 | 10/2013 | Vijayaraghavan et al. | |
| 2013/0317993 | A1* | 11/2013 | Wasserman | G06Q 30/016 705/304 |
| 2014/0006012 | A1* | 1/2014 | Zhou | G06F 16/3344 704/9 |
| 2014/0059030 | A1* | 2/2014 | Hakkani-Tur | G06F 16/3332 707/706 |
| 2014/0119531 | A1* | 5/2014 | Tuchman | H04M 3/5166 379/265.09 |
| 2014/0156660 | A1* | 6/2014 | Arbon | G06F 16/951 707/737 |
| 2014/0171133 | A1 | 6/2014 | Stuttle et al. | |
| 2014/0250195 | A1 | 9/2014 | Capper et al. | |
| 2014/0278755 | A1 | 9/2014 | Eberl et al. | |
| 2014/0317030 | A1 | 10/2014 | Shen et al. | |
| 2016/0092523 | A1* | 3/2016 | Chandrasekaran | G06N 5/046 707/602 |
| 2016/0110422 | A1 | 4/2016 | Roytman et al. | |
| 2016/0219048 | A1* | 7/2016 | Porras | H04L 41/40 |
| 2016/0246777 | A1* | 8/2016 | Moldoveanu | H04L 65/403 |
| 2016/0292199 | A1 | 10/2016 | Cronin et al. | |
| 2016/0358103 | A1* | 12/2016 | Bowers | G06F 9/4881 |
| 2017/0017694 | A1* | 1/2017 | Roytman | G06F 16/9535 |
| 2017/0075988 | A1 | 3/2017 | Kadiri et al. | |
| 2017/0180276 | A1 | 6/2017 | Gershony et al. | |

OTHER PUBLICATIONS

Iqbal, Muhammad Munwar, et al., "Automated Web-Bot Implementation using Machine Learning Techniques in eLearning Paradigm", J. Appl. Environ. Biol. Sci., vol. 4, Issue 7S, © 2014, pp. 90-98.*

Quarteroni, Silvia, et al., "A Chatbot-based Interactive Question Answering System", Decalog 2007, Trento, Italy, May 30-Jun. 1, 2007, pp. 83-90.*

Microsoft Computer Dictionary, 5th Edition, Microsoft Press, Redmond, WA, © 2002, pp. 30 and 33.*

Hall, Mark, et al., "The WEKA Data Mining Software: An Update", SIGKDD Explorations, vol. 11, No. 1, Nov. 2009, pp. 10-18.*

Shi, Haijian, "Best-first Decision Tree Learning", Master of Science Thesis, The University of Waikato, Hamilton, New Zealand, © 2007, 121 pages.*

Zukerman, Ingrid, et al., "Using Machine Learning Techniques to Interpret WH-questions", ACL '01, Toulouse, France, pp. 547-554.*

Bhargava, Deepshikha, et al., "Design and development of an Intelligent agent based framework for Predictive Analytics", INDIAcom, New Dehli, India, Mar. 16-18, 2016, pp. 3715-3718.*

AbuShawar, Bayan, et al., "ALICE Chatbot: Trails and Outputs", Computación y Sistemas, vol. 19, No. 4, 2015, pp. 625-632.*

Popirlan, Claudiu Ionut, "A solution based on intelligent software agents to improve the data searching in the contact centers", ITAIC 2011, Chongqing, China, Aug. 20-22, 2011, pp. 1-5.*

Chau et al. Analysis of the Query Logs of a Web Site Search Engine. Journal of the American Society for Information Science and Technology 56(13):1363-1376 (2005).

Co-pending U.S. Appl. No. 15/582,209, filed Apr. 28, 2017, 64 pages.

Gilbert et al. Intelligent Virtual Agents for Contact Center Automation. IEEE Signal Processing 32:10 pages (2005).

Kucukyilmaz et al. Chat mining: Predicting user and message attributes in computer-mediated communication. Information Processing and Management 44:1448-1466 (2008).

* cited by examiner

Fig. 5

ORDER STATUS

501 — What's the status of my order?

502 — Known user? — Yes →

No ↓

503 — For security purposes, please sign in to your Wingstop account and enter this activation code: XE23KD.

504 — Identified order? — Yes →

No ↓

505 — What's your order number?

506 — 4322

507 — Valid order? — Yes →

No ↓

508 — I'm having trouble finding that order. Try entering it again or type "help" and we'll get the team to look in to it.

509 — help

510 — Hang tight - we'll get back to you.

511 — Route to SMM

512 — Your order #4322 will be ready at 11:45am at the East Riverside location. Please call the store at (512) 355-5555 if you have any questions about your order.

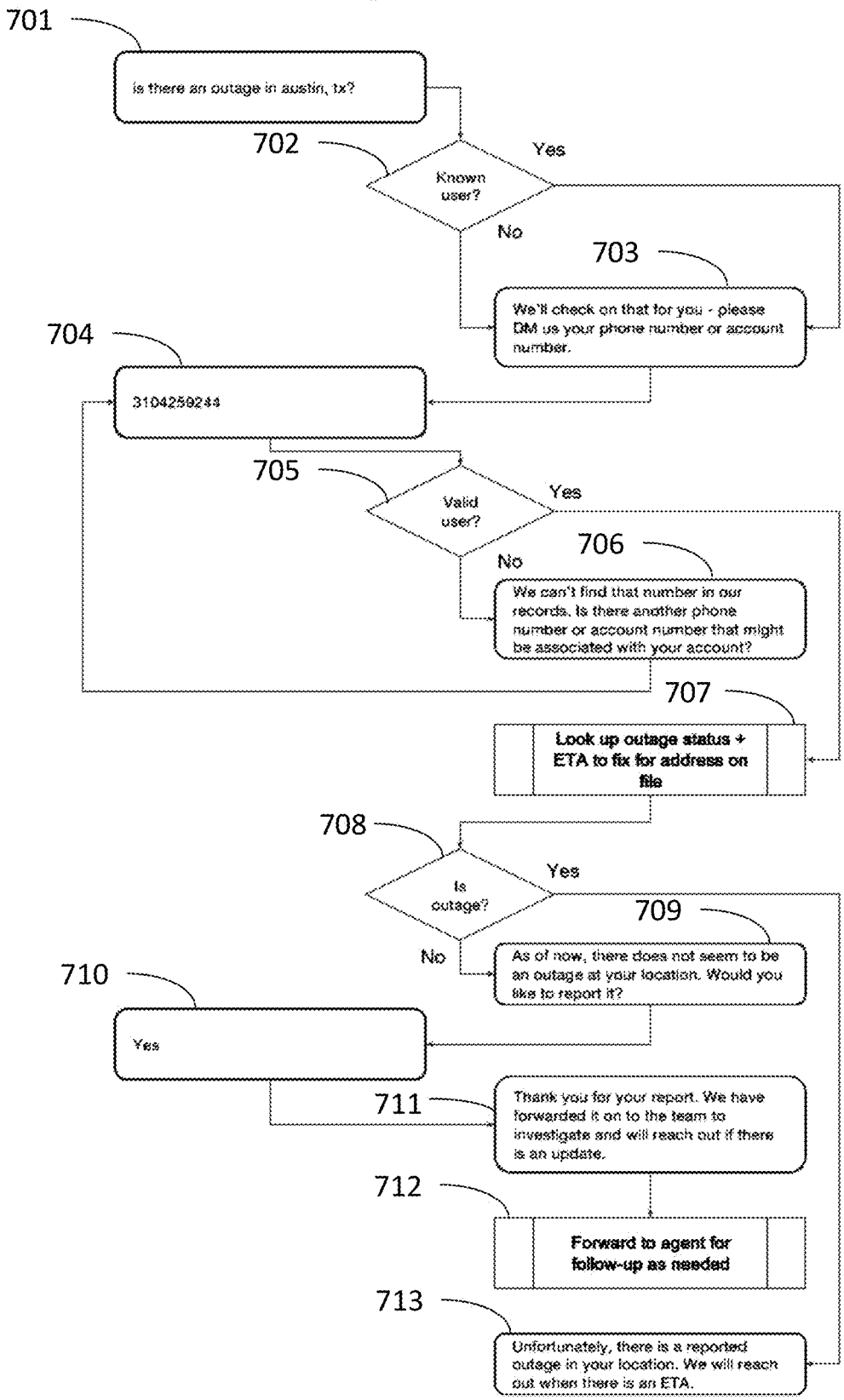

SYSTEMS, MEDIA, AND METHODS FOR AUTOMATED RESPONSE TO QUERIES MADE BY INTERACTIVE ELECTRONIC CHAT

CROSS-REFERENCE TO RELATED APPLICATIONS

This application is a continuation of U.S. patent application Ser. No. 15/582,209, filed Apr. 28, 2017, now U.S. Pat. No. 9,785,715, which claims the benefit of U.S. Provisional Application No. 62/329,582, filed Apr. 29, 2016, the contents of each of which is incorporated herein in its entirety by reference.

BACKGROUND OF THE INVENTION

Social networking and media apps are now ubiquitous. Moreover, mobile messaging apps are growing ever more popular as they add social networking features.

SUMMARY OF THE INVENTION

Brands need to actively pursue customers in the social and messaging channels they're already using, through 1-to-1 social customer care; however, existing customer care technologies force users to a dedicated website, mobile app, or call center. Disclosed herein is a social enterprise software platform for automated customer care that provides customers with the quick answers to their requests that they expect and enables commerce via the social and messaging applications that customers are already using. Importantly, the platform described herein utilizes machine logic and learning methodologies to partially, or entirely, automate customer care conversations to facilitate scalability, which is absent from current human-powered social customer care technologies.

In one aspect, disclosed herein are computer-implemented systems comprising: a digital processing device comprising: at least one processor, an operating system configured to perform executable instructions, a memory, and a computer program including instructions executable by the digital processing device to create a social query response application comprising: a software module monitoring queries from users, each query submitted to a vendor via an interactive chat feature of an external electronic communication platform, monitoring human responses to the queries, and monitoring subsequent communications conducted via the electronic communication platform until each query is resolved; a software module applying a first machine learning algorithm to the monitored communications to identify one or more queries susceptible to response automation; and a software module applying a second machine learning algorithm to the queries susceptible to response automation to identify one or more responses likely to resolve the query. In various embodiments, the interactive chat is typed or verbal. In some embodiments, the application further comprises: a software module receiving a query from a user, the query submitted to the vendor via an interactive chat feature of an external electronic communication platform; a software module automatically responding to the query with the identified one or more responses likely to resolve the query; a software module determining when the query is resolved; and a software module transmitting the outcome of the resolution to an enterprise software system. In further embodiments, the enterprise software system comprises an ordering system, a concierge system, a delivery system, an authorization system, a calendaring system, a reservation system, a CRM system, or a knowledge base system. In some embodiments, the application monitors queries from users across all electronic communication platforms utilized by the vendor. In some embodiments, the application further comprises a software module providing an interface allowing a user to authenticate one or more of their electronic communication platform accounts with the application. In some embodiments, the application further comprises a software module identifying the user sending each query and retrieving data pertaining to previous interactions between the user and the vendor. In further embodiments, the first machine learning algorithm or the second machine learning algorithm utilizes the data pertaining to previous interactions. In some embodiments, the application further comprises a software module providing an administrative interface allowing an administrator to add, remove, and edit automated responses. In some embodiments, the application further comprises a software module notifying a human to respond to a query susceptible to response automation with one or more responses likely to resolve the query. In further embodiments, the software module notifying a human to respond provides suggested responses and, for each, a percentage of users who respond with the suggested response. In some embodiments, the application further comprises a software module instantiating an autonomous software agent to respond to a query susceptible to response automation with one or more responses likely to resolve the query. In some embodiments, the first machine learning algorithm or the second machine learning algorithm utilizes the historic number of communications required to resolve similar queries. In some embodiments, the second machine learning algorithm utilizes a glossary, knowledge base, or enterprise database. In some embodiments, the first machine learning algorithm or the second machine learning algorithm utilizes a user status. In further embodiments, the user status is VIP or loyalty program participant. In some embodiments, at least one query is a request to order goods or services. In further embodiments, the request to order goods or services is a repeat of a previous order. In various embodiments, at least one query pertains to deals or promotions, availability of products or services, event scheduling, a notification, troubleshooting, contact information, locations, hours of operation, a status update, or a loyalty program. In some embodiments, the application is accessed via an API.

In another aspect, disclosed herein are non-transitory computer-readable storage media encoded with a computer program including instructions executable by a processor to create a social query response application comprising: a software module monitoring queries from users, each query submitted to a vendor via an interactive chat feature of an external electronic communication platform, monitoring human responses to the queries, and monitoring subsequent communications conducted via the electronic communication platform until each query is resolved; a software module applying a first machine learning algorithm to the monitored communications to identify one or more queries susceptible to response automation; and a software module applying a second machine learning algorithm to the queries susceptible to response automation to identify one or more responses likely to resolve the query. In various embodiments, the interactive chat is typed or verbal. In some embodiments, the application further comprises: a software module receiving a query from a user, the query submitted to the vendor via an interactive chat feature of an external electronic communication platform; a software module automatically responding to the query with the identified one or more responses likely to resolve the query; a software module determining when the query is resolved; and a software module transmitting the outcome of the resolution to an enterprise software system. In further embodiments, the enterprise software system comprises an ordering system, a concierge system, a delivery system, an authorization system, a calendaring system, a reservation system, a CRM system, or a knowledge base system. In some embodiments, the application monitors queries from users across all electronic communication platforms utilized by the vendor. In some embodiments, the application further comprises a software module providing an interface allowing a user to authenticate one or more of their electronic communication platform accounts with the application. In some embodiments, the application further comprises a software module identifying the user sending each query and retrieving data pertaining to previous interactions between the user and the vendor. In further embodiments, the first machine learning algorithm or the second machine learning algorithm utilizes the data pertaining to previous interactions. In some embodiments, the application further comprises a software module providing an administrative interface allowing an administrator to add, remove, and edit automated responses. In some embodiments, the application further comprises a software module notifying a human to respond to a query susceptible to response automation with one or more responses likely to resolve the query. In further embodiments, the software module notifying a human to respond provides suggested responses and, for each, a percentage of users who respond with the suggested response. In some embodiments, the application further comprises a software module instantiating an autonomous software agent to respond to a query susceptible to response automation with one or more responses likely to resolve the query. In some embodiments, the first machine learning algorithm or the second machine learning algorithm utilizes the historic number of communications required to resolve similar queries. In some embodiments, the second machine learning algorithm utilizes a glossary, knowledge base, or enterprise database. In some embodiments, the first machine learning algorithm or the second machine learning algorithm utilizes a user status. In further embodiments, the user status is VIP or loyalty program participant. In some embodiments, at least one query is a request to order goods or services. In further embodiments, the request to order goods or services is a repeat of a previous order. In various embodiments, at least one query pertains to deals or promotions, availability of products or services, event scheduling, a notification, troubleshooting, contact information, locations, hours of operation, a status update, or a loyalty program. In some embodiments, the application is accessed via an API.

In another aspect, disclosed herein are computer-implemented methods for social query response comprising: monitoring, by a computer, queries from users, each query submitted to a vendor via an interactive chat feature of an external electronic communication platform, monitoring, by the computer, human responses to the queries, monitoring, by the computer, subsequent communications conducted via the electronic communication platform until each query is resolved; applying, by the computer, a first machine learning algorithm to the monitored communications to identify a query susceptible to response automation; applying, by the computer, a second machine learning algorithm to the query susceptible to response automation to identify one or more responses likely to resolve the query; and either i) notifying, by the computer, a human to respond to the query susceptible to response automation with the one or more responses likely to resolve the query, or ii) instantiating, by the computer, an autonomous software agent configured to respond to the query susceptible to response automation with the one or more responses likely to resolve the query. In various embodiments, the interactive chat is typed or verbal. In some embodiments, the method further comprises: receiving, by the computer, a query from a user, the query submitted to the vendor via an interactive chat feature of an external electronic communication platform; automatically responding, by the computer, to the query with the identified one or more responses likely to resolve the query; determining, by the computer, when the query is resolved; and transmitting, by the computer, the outcome of the resolution to an enterprise software system. In further embodiments, the enterprise software system comprises an ordering system, a concierge system, a delivery system, an authorization system, a calendaring system, a reservation system, a CRM system, or a knowledge base system. In some embodiments, the communications are monitored across all electronic communication platforms utilized by the vendor. In some embodiments, the method further comprises providing, by the computer, an interface allowing a user to authenticate one or more of their electronic communication platform accounts with the application. In some embodiments, the method further comprises identifying, by the computer, the user sending each query and retrieving data pertaining to previous interactions between the user and the vendor. In further embodiments, the first machine learning algorithm or the second machine learning algorithm utilizes the data pertaining to previous interactions. In some embodiments, the method further comprises providing, by the computer, an administrative interface allowing an administrator to add, remove, and edit automated responses. In some embodiments, the first machine learning algorithm or the second machine learning algorithm utilizes the historic number of communications required to resolve similar queries. In some embodiments, the first machine learning algorithm or the second machine learning algorithm utilizes the historic number of communications required to resolve similar queries. In some embodiments, the second machine learning algorithm utilizes a glossary, knowledge base, or enterprise database. In some embodiments, the first machine learning algorithm or the second machine learning algorithm utilizes a user status. In further embodiments, the user status is VIP or loyalty program participant. In various embodiments, at least one query pertains to deals or promotions, availability of products or services, event scheduling, a notification, troubleshooting, contact information, locations, hours of operation, a status update, or a loyalty program.

BRIEF DESCRIPTION OF THE DRAWINGS

A better understanding of the features and advantages of the present invention will be obtained by reference to the following detailed description that sets forth illustrative embodiments and the accompanying drawings of which:

FIG. 5 shows a non-limiting example of a process flow diagram; in this case, a diagram illustrating the use case wherein a user inquires about the status of a particular order, and the query is resolved;

FIG. 7 shows a non-limiting example of a process flow diagram; in this case, a diagram illustrating the use case wherein a user inquires about the existence of a service interruption in a particular location, and the query is resolved;

DETAILED DESCRIPTION OF THE INVENTION

Figure 1:
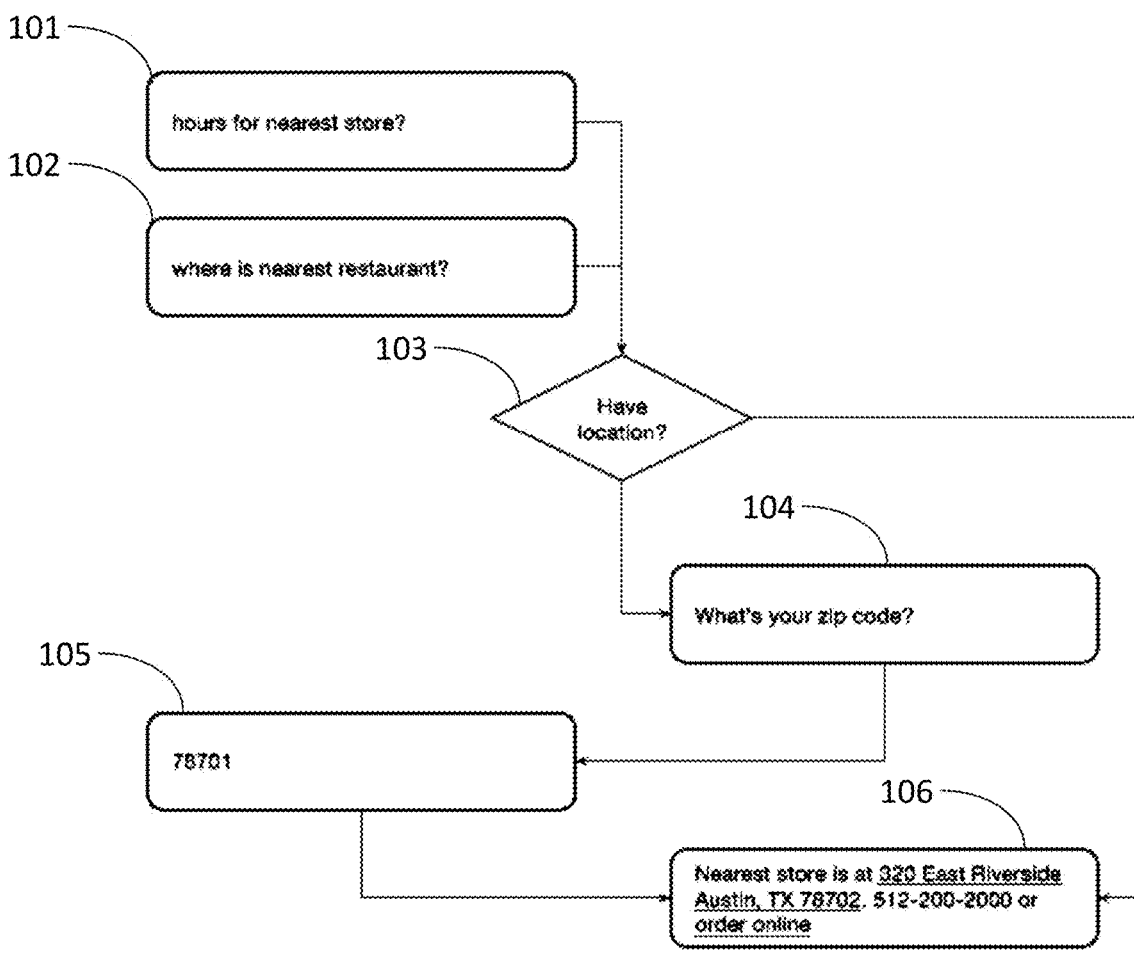
FIG. 1 shows a non-limiting example of a process flow diagram; in this case, a diagram illustrating the use case wherein a user inquires about the hours for the nearest store and/or the location of the nearest store, and the query is resolved.

Described herein, in certain embodiments, are computer-implemented systems comprising: a digital processing device comprising: at least one processor, an operating system configured to perform executable instructions, a memory, and a computer program including instructions executable by the digital processing device to create a social query response application comprising: a software module monitoring queries from users, each query submitted to a vendor via an interactive chat feature of an external electronic communication platform, monitoring human responses to the queries, and monitoring subsequent communications conducted via the electronic communication platform until each query is resolved; a software module applying a first machine learning algorithm to the monitored communications to identify one or more queries susceptible to response automation; and a software module applying a second machine learning algorithm to the queries susceptible to response automation to identify one or more responses likely to resolve the query.

Also described herein, in certain embodiments, are non-transitory computer-readable storage media encoded with a computer program including instructions executable by a processor to create a social query response application comprising: a software module monitoring queries from users, each query submitted to a vendor via an interactive chat feature of an external electronic communication platform, monitoring human responses to the queries, and monitoring subsequent communications conducted via the electronic communication platform until each query is resolved; a software module applying a first machine learning algorithm to the monitored communications to identify one or more queries susceptible to response automation; and a software module applying a second machine learning algorithm to the queries susceptible to response automation to identify one or more responses likely to resolve the query.

Also described herein, in certain embodiments, are computer-implemented methods for social query response comprising: monitoring, by a computer, queries from users, each query submitted to a vendor via an interactive chat feature of an external electronic communication platform, monitoring, by the computer, human responses to the queries, monitoring, by the computer, subsequent communications conducted via the electronic communication platform until each query is resolved; applying, by the computer, a first machine learning algorithm to the monitored communications to identify a query susceptible to response automation; applying, by the computer, a second machine learning algorithm to the query susceptible to response automation to identify one or more responses likely to resolve the query; and either i) notifying, by the computer, a human to respond to the query susceptible to response automation with the one or more responses likely to resolve the query, or ii) instantiating, by the computer, an autonomous software agent configured to respond to the query susceptible to response automation with the one or more responses likely to resolve the query.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "question," "query," or "inquiry" refer to user input such as questions provided by a consumer. In some cases, user input is provided by an administrator or administrative user. For example, in some cases, an administrative user provides input for purposes of adding, modifying, or training algorithms for answering consumer questions.

As used herein, "answer" and "response" refer to the reply provided by the application, software, or algorithm in response to user input.

Monitoring

In some embodiments, the platforms, systems, media, and methods described herein include features to monitor electronic communications, or use of the same. In further embodiments, the electronic communications are conducted via an interactive chat feature of an external electronic communication platform. Many text-based communications platforms such as SMS, Facebook, Twitter, WhatsApp, Kik, and the like are suitably monitored. Also, many voice-based communications platforms such as Siri, Amazon Echo, Google Now, and the like are suitably monitored. In a particular embodiment, the applications described herein simultaneously monitor queries from users across all electronic communication platforms utilized by a vendor (e.g., company or organization) for their online/mobile presence.

In some embodiments, the platforms, systems, media, and methods described herein include features to monitor user queries and subsequent communications in response, or use of the same. In further embodiments, a query is submitted to a vendor via an interactive chat feature of an external electronic communication platform. In still further embodiments, the platforms, systems, media, and methods described herein include features to monitor subsequent communications until each query is resolved.

Many types of queries are suitably monitored. In various embodiments, at least one query pertains to deals or promotions, availability of products or services, event scheduling, a notification, troubleshooting, contact information, locations, hours of operation, a status update, or a loyalty program.

Referring to FIG. 1, in a particular embodiment, a user inquires about the hours for the nearest store and/or the location of the nearest store, subsequent communications are conducted, and the query is resolved. First, the user provides a query such as "hours for nearest store?" 101 or "where is nearest restaurant?" 102. In some embodiments, the application comprises an algorithm for processing the query to extract the most relevant data (e.g., tokenizing the message). In some embodiments, the algorithm identifies all the words in the query, and then filters out words likely to have low relevance (e.g., "a," "an," "the," "as," etc.). In some embodiments, low relevance or irrelevant words are listed in a reference database. In some embodiments, the words in the query are compared against a reference database containing a word list with associated relevance (e.g., low, medium, high relevance or a relevance score) to determine whether the words are to be used. In some embodiments, the relevance of a word changes depending on the presence of other words. In some embodiments, words are grouped together to determine relevance. For example, in some embodiments, the presence of a particular combination of words such as a phrase or multi-word term is assigned a relevance (e.g., "movie theater" or "where is the nearest"). For example, in some embodiments, the most relevant data for query 101 are the words "hours," "nearest," and "store" with "for" determined to have low relevance. Alternatively, in some embodiments, the word "for" in query 101 is determined to have high relevance. In some embodiments, an algorithm attempts to identify an answer likely to result in a resolution using the identified relevant words or terms. In some embodiments, the algorithm uses one or more of: 1) glossary look-up (i.e., this keyword or phrase means this intent and return this answer); 2) look-up or set data in an enterprise system (i.e., account status, order status, make reservation, etc.); 3) look-up in a knowledge base; 4) natural language processing; and 5) other AI. In FIG. 1, once the algorithm has determined that user query 102 is requesting the location of the nearest restaurant, it determines whether the user location is known 103. If user location is known, then the algorithm finds the closest restaurant (e.g., using a maps application programming interface such as the Google Maps API) to the user location and provides it to the user 106. Alternatively, if the user location is not known, then the user is asked to provide location 104 (e.g., zip code). Once the user provides the requested location 105, the algorithm provides the nearest restaurant with an answer including information such as one or more of nearest restaurant location, contact information, and online ordering options 106.

Figure 2:
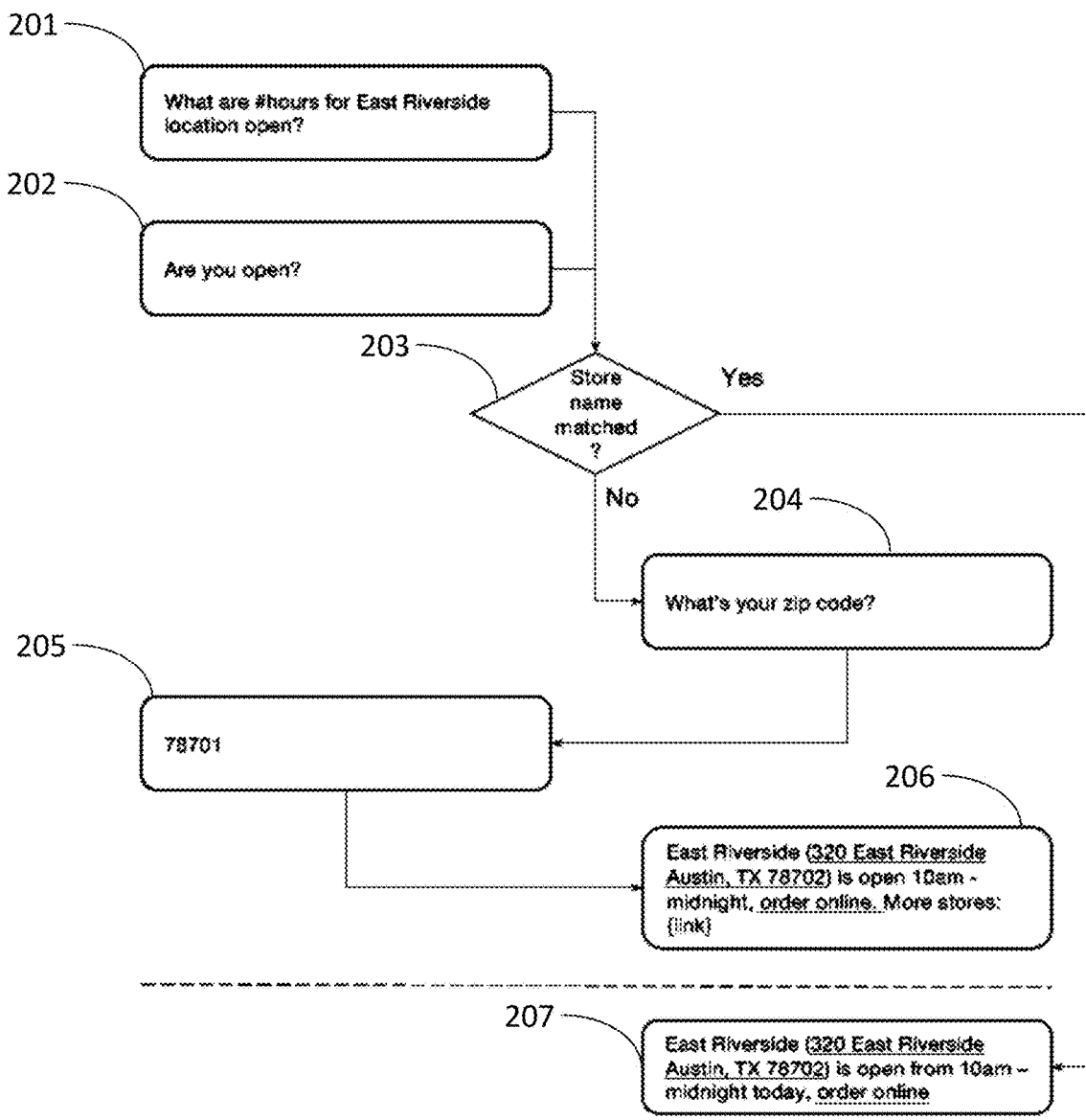
FIG. 2 shows a non-limiting example of a process flow diagram; in this case, a diagram illustrating the use case wherein a user inquires about whether a particular store is currently open, and the query is resolved.

Referring to FIG. 2, in a particular embodiment, a user inquires about whether a particular store is currently open, subsequent communications are conducted, and the query is resolved. First, the user provides a query such as "what are #hours for East Riverside location open?" 201 or "are you open?" 202. In this case, the application provides an algorithm for processing the query 201 to determine that the user is requesting the hours for a store (e.g., a glossary look-up indicates that a word set containing both "hours" and "open" means the query is asking for store hours). In some embodiments, the algorithm is a machine learning algorithm. In some embodiments, the algorithm is trained to assign and/or change the meaning of certain words or word sets in the glossary. For example, in some embodiments, an administrative user creates question-answer sets for training the algorithm. The algorithm then processes the question-answer sets to improve its ability to determine the intent of the question and/or the appropriate answer. In this particular embodiment, the algorithm determines that the user is requesting the hours for the "East Riverside" store and attempts to locate the store 203. If there is no match for the store name (e.g., need user location to find store match), then the algorithm asks for the user's location 204 (e.g., zip code or address). Once the user provides the requested location 205, the algorithm provides the user with an answer 206 including information such as one or more of the nearest store location, hours, an online ordering link (e.g., Internet link), and other locations. Alternatively, if there is a match for the store name, then the algorithm provides the answer 207 including information such as one or more of the nearest store location, hours, and an online ordering link without asking for the user's location. In some embodiments, the answer is selected from a database of answers. In some embodiments, the selected answer is a highest scoring (e.g., highest confidence) answer according to the algorithm. As an illustrative example, a trained algorithm responding to the user query 202 determines based on the relevant keywords (in this case, the phrase "are you open") that there are multiple answers that are responsive to the query. However, based on the historical query & answer sessions, the algorithm has determined a relevance to each answer and selects the answer with the highest relevance. In some embodiments, the answer with the highest relevance must meet a threshold relevance in order to be selected. In some embodiments, when no answer meets the threshold relevance, the algorithm does not provide an answer in response to the query. In further embodiments, an administrative user reviews the query and provides an answer, which is optionally used to further train the algorithm.

Figure 3:
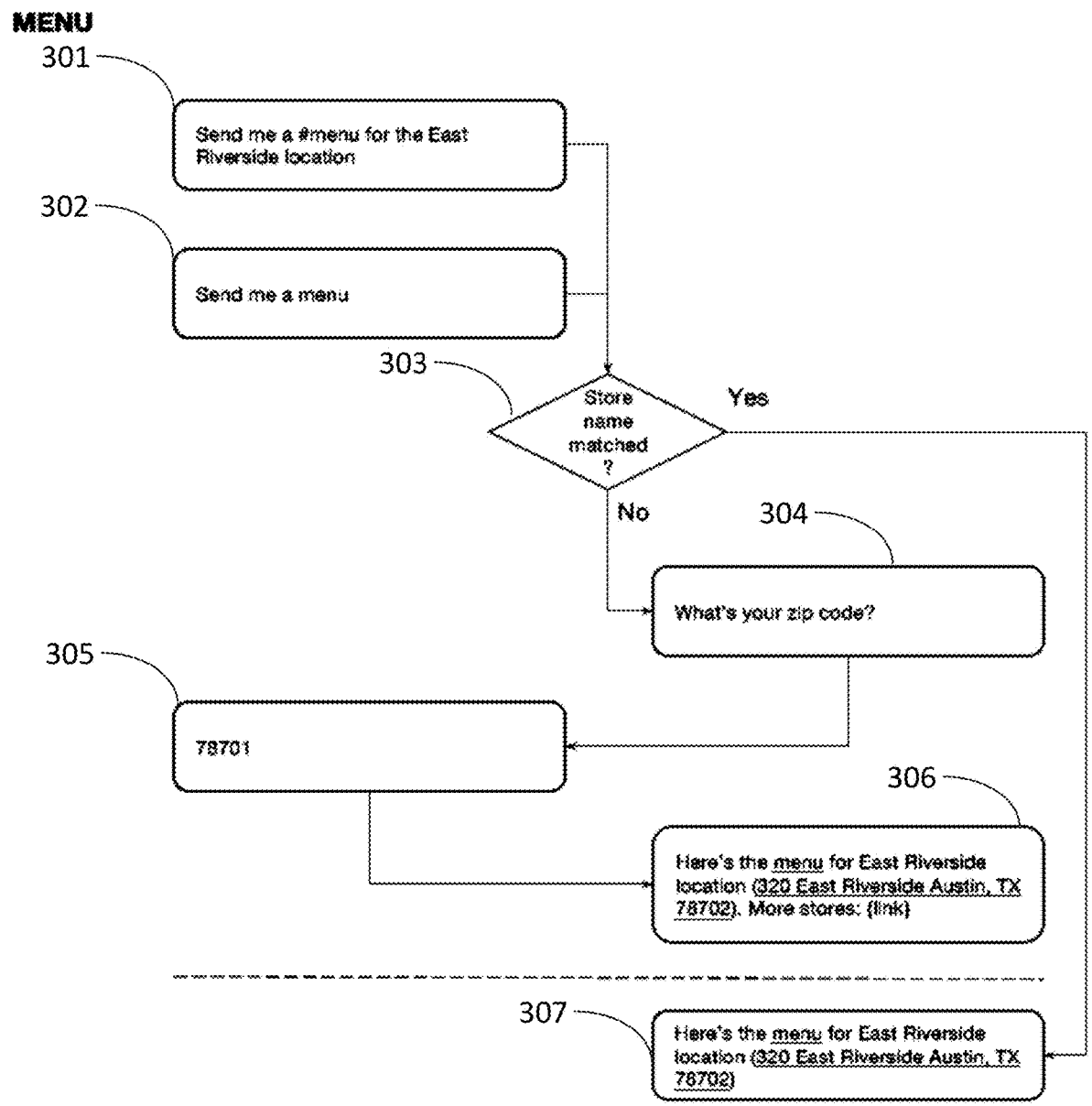
FIG. 3 shows a non-limiting example of a process flow diagram; in this case, a diagram illustrating the use case wherein a user inquires about access to a menu, and the query is resolved.

Referring to FIG. 3, in a particular embodiment, a user inquires about access to a menu, subsequent communications are conducted, and the query is resolved. First, the user provides a query such as "send me a #menu for the East Riverside location" 301 or "send me a menu" 302. In some embodiments, the application comprises an algorithm identifying that the query is susceptible to response automation. For example, in some embodiments, the algorithm evaluates the query to determine a question type. In some embodiments, the algorithm parses the query into individual words, terms, or phrases to identify relevant words indicative of question type. For example, some words indicate the question type clearly such as, for example, "who," "what," "when," and "where," which indicate the answer is likely to be a person, a thing, a time/date, and a location, respectively. In some embodiments, the algorithm parses the query into segments of one or more words and tags each parsed segment with a syntactic part of speech (POS). Next, an algorithm identifies one or more responses likely to resolve the query. In some embodiments, the algorithm identifies the one or more responses based on the question type. For example, in some embodiments, the algorithm processes the query to identify a person, place, or thing that is present in the query alongside word(s) indicating a request for a location. In some embodiments, the algorithm parses the query and compares the parsed segments against a database (e.g., a glossary or lexical dictionary) to obtain one or more likely persons, places, or things. In some embodiments, once the algorithm has determined the question type (e.g., asking for location) and the subject of the question (e.g., a restaurant), the algorithm then locates one or more responses likely to address the question/query. In some embodiments, the responses are stored in a database. In some embodiments, a response is identified based on key words corresponding to the question type and/or subject of the question. In some embodiments, the responses are classified using a vector space model, wherein responses are represented as vectors with each word being represented as a term with a term weight. In some embodiments, the algorithm is trained on query/response sets. In FIG. 3, a query 301 requesting a menu for a restaurant location is received. An algorithm processes the query to determine that there is a response 303 to the query and provides the response, which includes information such as, for example, the menu and/or the location of the restaurant. Alternatively, if the query 302 does not indicate the restaurant location, the application requests location from the user 304 (e.g., zip code), and upon receiving the location from the user 305, provides the menu and address of the restaurant as a response 307.

Figure 4:
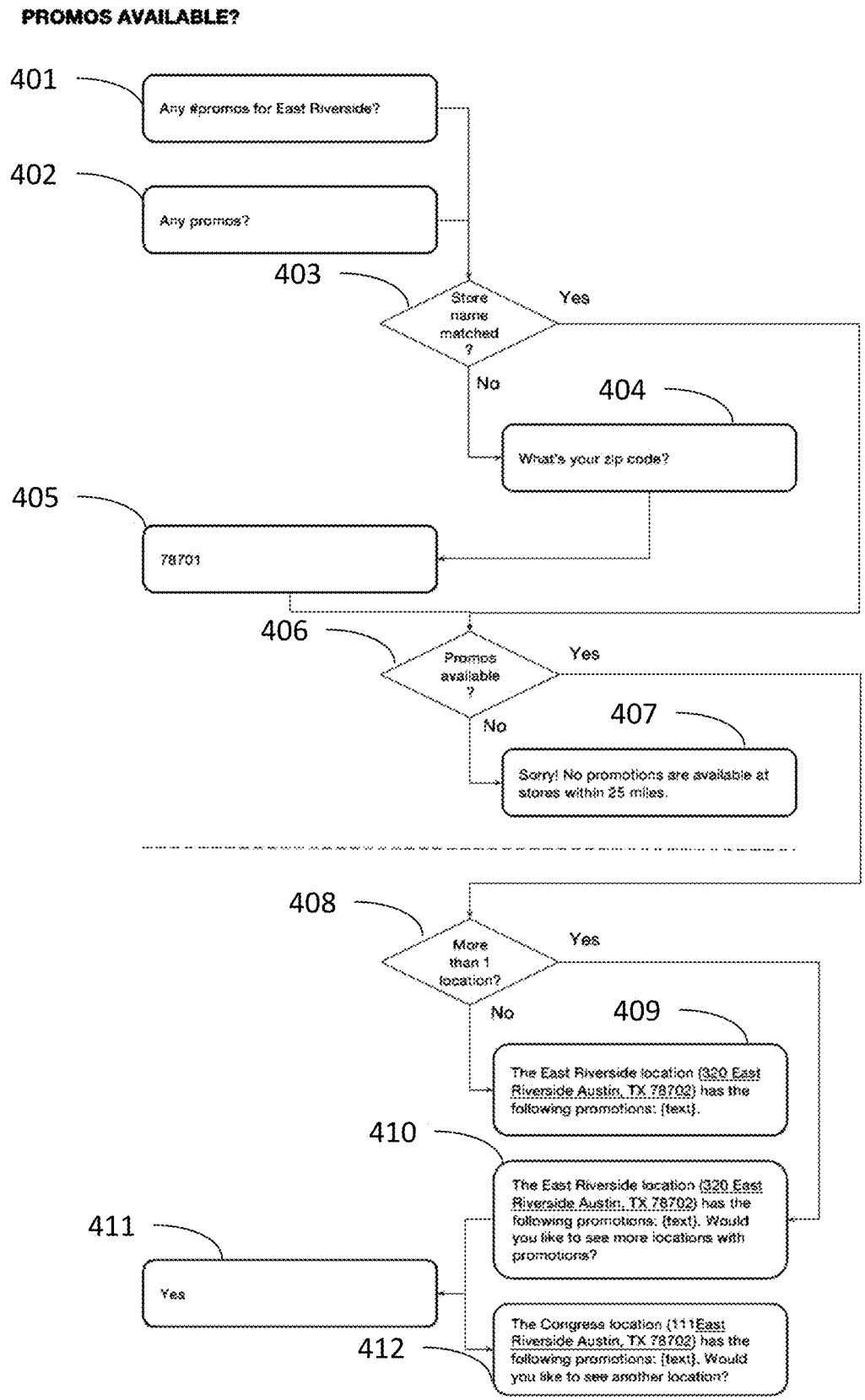
FIG. 4 shows a non-limiting example of a process flow diagram; in this case, a diagram illustrating the use case wherein a user inquires about promotions available, and the query is resolved.

Referring to FIG. 4, in a particular embodiment, a user inquires about promotions available, subsequent communications are conducted, and the query is resolved. The user provides a query such as "any #promos for East Riverside" 401 or "any promos" 402. An algorithm processes the query and determines an appropriate response. In some embodiments, the algorithm parses the query into relevant keywords and searches a database for responses likely to resolve the query. In some embodiments, parsed words or phrases are searched against a database (e.g., glossary or reference database) to determine its meaning. In some embodiments, the algorithm determines a response with information on promotions for a store is likely to resolve the query. In some embodiments, when the user location is known, the algorithm checks if promotions are available at a nearby store location 406. Alternatively, when user location is unknown, the algorithm is unable to locate the store 403 and asks the user for location information 404. If no promotions are available, the algorithm informs the user that no promotions are available (e.g., at stores within 25 miles). If promotions are available, the algorithm checks if there is more than one location 408. If there is more than one location, then the algorithm provides one location (e.g., store name, location, promotions) and asks the user if the user would like to see more locations with promotions. If the user answers yes 411, the algorithm locates another store location and provides the name, location, and promotions 412.

Referring to FIG. 5, in a particular embodiment, a user inquires about the status of a particular order, subsequent communications are conducted, and the query is resolved. A user query is received such as, for example, "what's the #status of my order" 501. In response, the algorithm first determines if this query is provided by a known user 502. If this is not a known user, the algorithm requests user sign-in to an account (e.g., for the restaurant the user ordered from) 503 and optionally provides an access code for the account. The algorithm then attempts to locate the order 504. Alternatively, if this is a known user, the algorithm proceeds to locating/identifying the order 504. If the order is identified, then the algorithm provides a response 512 comprising one or more of the order number, when it will be ready, the restaurant location, and contact information if the user has questions about the order. Alternatively, if the order is not identified, the algorithm asks for the order number 505 and an option for the user to request help, e.g., by typing "help". If the user provides the order number 506, the algorithm checks if this is a valid order 507. If the order is not valid, the algorithm requests the user enter it again 508. If the order is valid, the algorithm goes ahead and provides the response 512. If the user types "help" 509, then the algorithm informs the user that help will be provided 510, and then routes the user to social media marketing (SMM) 511.

Figure 6A:
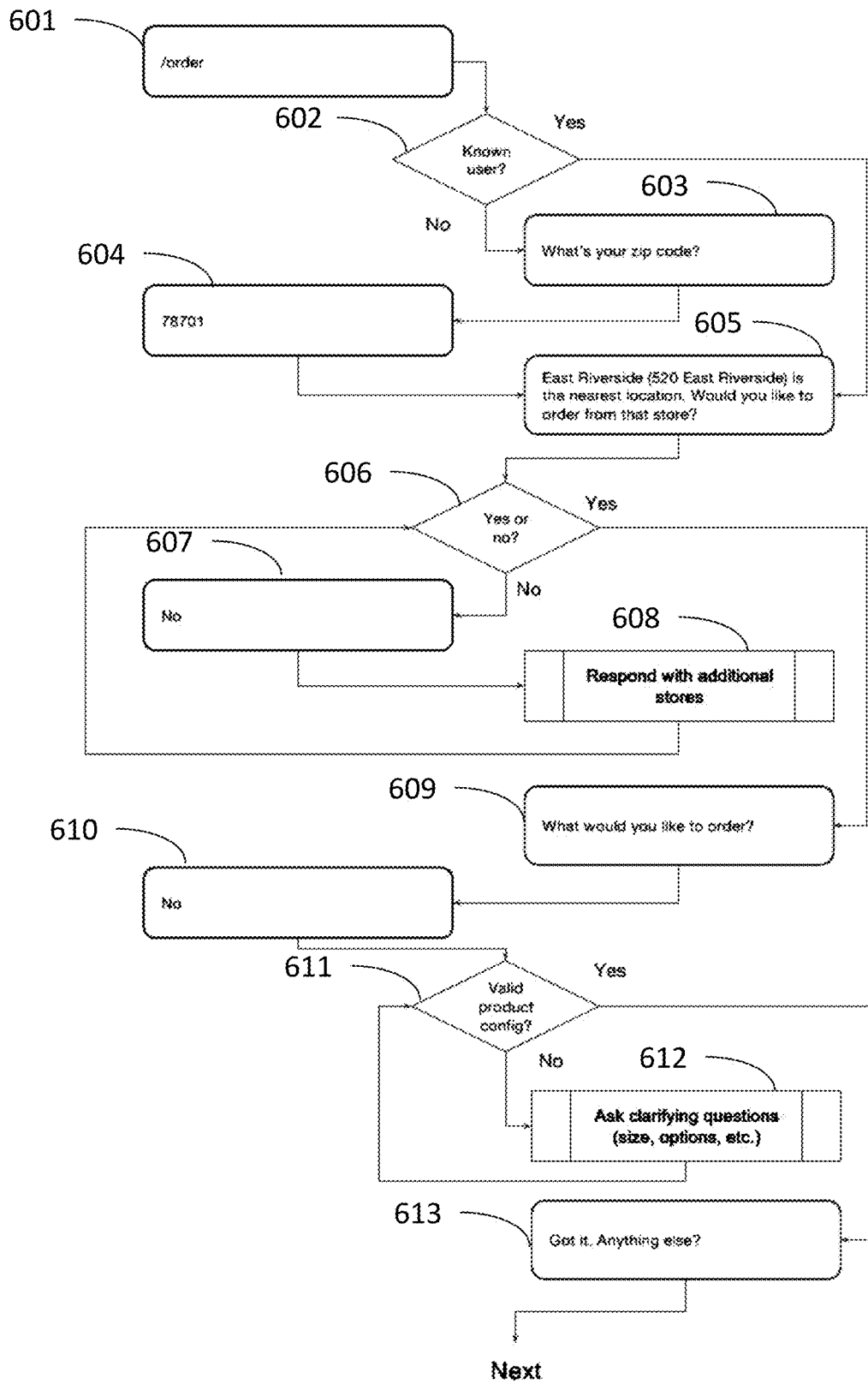
FIGS. 6A and 6B show a non-limiting example of a process flow diagram; in this case, a diagram illustrating the use case wherein a user expresses interest in placing an order, and the order is placed and confirmed.
Figure 6B:
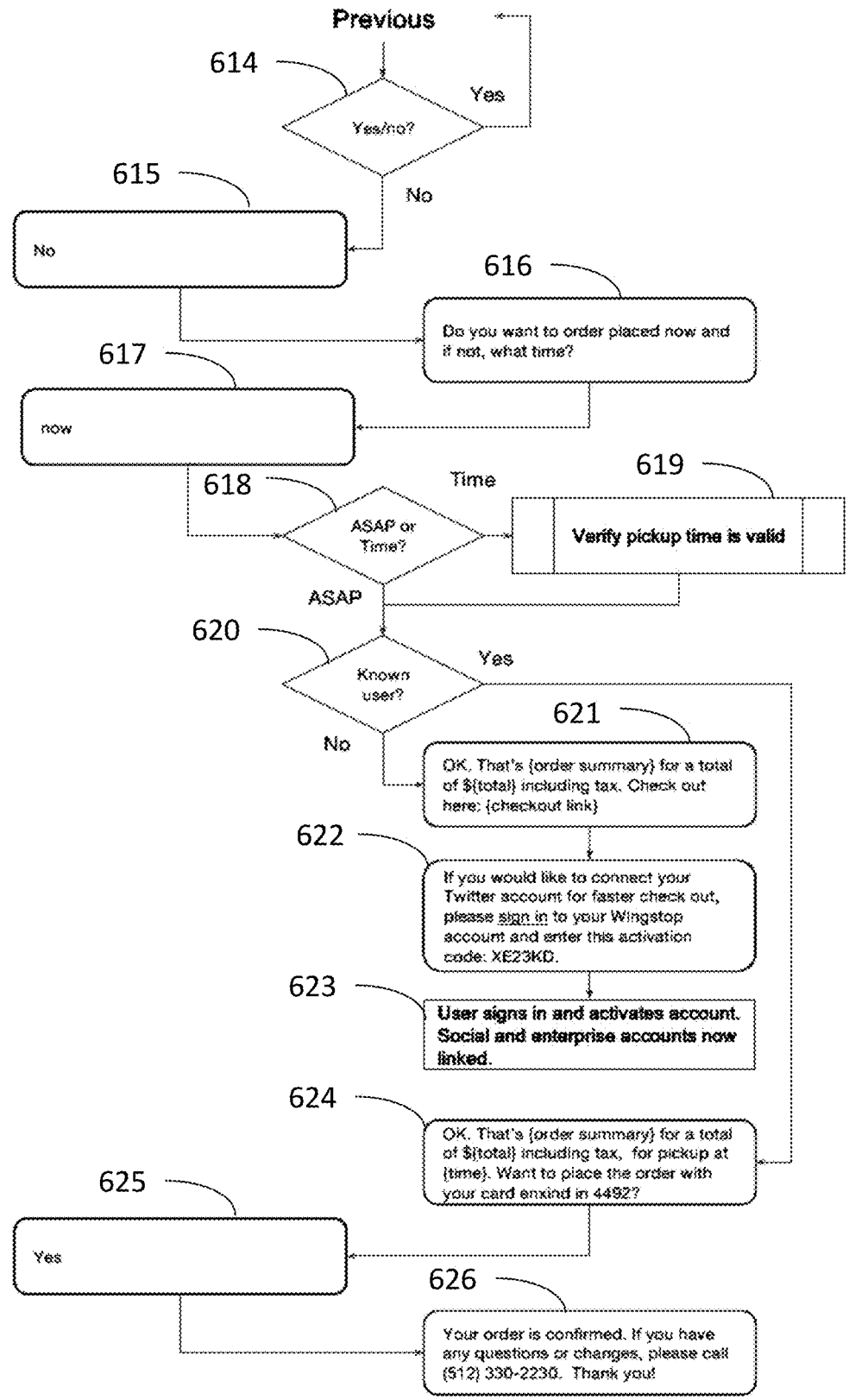

Referring to FIGS. 6A and 6B, in a particular embodiment, a user expresses interest in placing an order (e.g., at a store), subsequent communications are conducted, and the order is placed and confirmed. The user provides a query 601 such as "/order." In FIG. 6A, the algorithm checks if this is a known user 602. If this is a known user with a known location (e.g., stored on user profile), the algorithm provides information for the nearest store location. Alternatively, if this user does not have a known location, the algorithm requests the location from the user 603. If the user provides the location 604, then the algorithm proceeds to provide information on the nearest store location along with a question as to whether the user wants to place an order from that store 605. The user has the option to answer yes or not 606. If the user answers no, then the algorithm responds with additional stores 608. If the user answers yes, then the algorithm asks the user for an order 609. If the user answers no 610, then the algorithm asks the user if the product configuration is valid 611. If the user indicates the configuration is not valid, the algorithm optionally asks clarifying questions 612 such as, for example, size, options, etc.

Alternatively, if the product configuration is valid, then the algorithm places the order and asks the user for any other instructions/questions 613. Referring to FIG. 6B, if the user answers in the affirmative 614, then the process starts over again for another order. Alternatively, if the user indicates he/she does not want to place another order 615, the algorithm asks the user if the order is to be placed now or at a later time. If the user answers now 617, then the algorithm optionally asks if the user wants the order ASAP or at a specific time 618. If the user selects a time, then the algorithm verifies that the pickup time is valid 619. If the user wants the order ASAP, the algorithm then checks if this is a known user 620. If yes, the algorithm processes the order and provides an order summary (e.g., total cost, pickup time, and requested payment information) and requests confirmation to pay using a credit card 621. If the user answers yes 625, the algorithm makes the order and informs the user the order is confirmed 626. In some embodiments, the algorithm provides an order summary if the user is unknown 621, and then asks the user to decide whether to connect a social media account for faster checkout (e.g., twitter account, etc.) 622. If the user signs in and activates the account, then the social media and the current restaurant/store account are linked 623.

Referring to FIG. 7, in a particular embodiment, a user inquires about the existence of a service interruption in a particular location, subsequent communications are conducted, and the query is resolved. The user provides a query such as "is there an outage in Austin, Tex." 701. The algorithm processes the query and determines a response likely to resolve the query. However, more information is needed. Regardless of whether the user is known or not 702, the user is asked for identifying information such as, for example, a phone number or account number 703. If the user provides the identifying information 704, then the information is evaluated to determine if this is a valid user 705. If no, then different identifying information is requested 706 (e.g., another phone number or account number). Conversely, if this is a valid user, then the algorithm looks up the outage status and ETA for fixing the outage for the address on file for this user account 707. If the outage 708 does exist, then the user receives a response indicating the outage status and/or ETA 713. If the outage 708 does not exist, then a response indicating there is no outage at the location is sent 709. The response optionally includes a request for the user to report an outage. In response, if the user wishes to report an outage 710, then the algorithm responds to let the user know the reported outage has been received 711 and then forwards the information 712 (e.g., for follow-up as needed).

Figure 8:
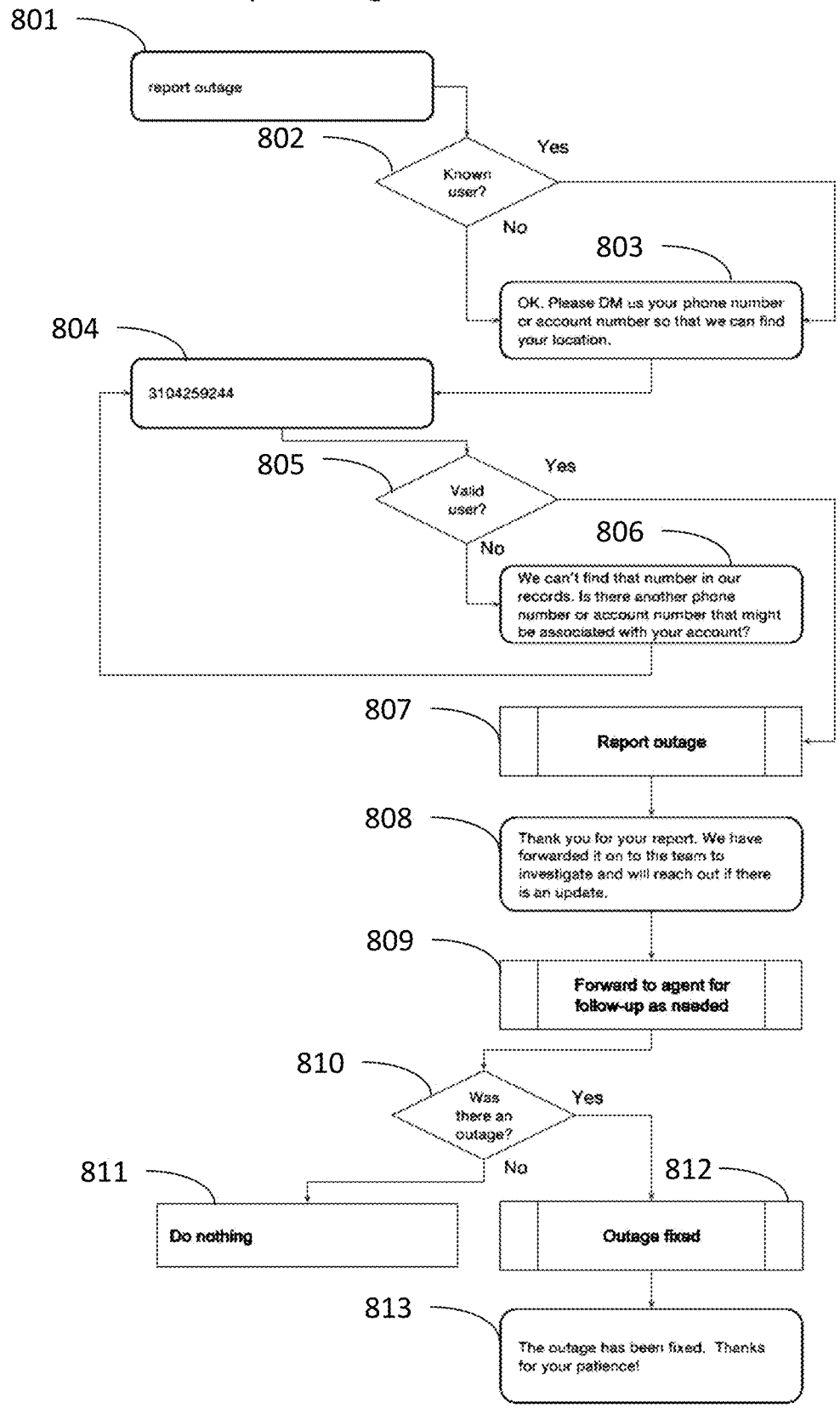
FIG. 8 shows a non-limiting example of a process flow diagram; in this case, a diagram illustrating the use case wherein a user reports a service interruption, and the report is handled.

Referring to FIG. 8, in a particular embodiment, a user reports a service interruption, subsequent communications are conducted, and the report is handled. The user provides a query such as "report outage" 801. The algorithm processes the query and determines a response likely to resolve the query. However, more information is needed. Regardless of whether the user is known or not 802, the user is asked for identifying information such as, for example, a phone number or account number 803. If the user provides the identifying information 804, then the information is evaluated to determine if this is a valid user 805. If no, then different identifying information is requested 806 (e.g., another phone number or account number). Conversely, if this is a valid user, then the algorithm reports the outage 807 and responds to the user 808 (e.g., thanking the user for the report and letting the user know the outage will be invested). The algorithm then forwards the outage information to an agent for follow-up as needed 809. In some embodiments, the algorithm then checks to confirm if there was an outage 810. If no, then nothing is done 811. If yes, then once the outage is fixed 812, the algorithm sends a response indicating the outage has been fixed 813 (e.g., status update).

Figure 9:
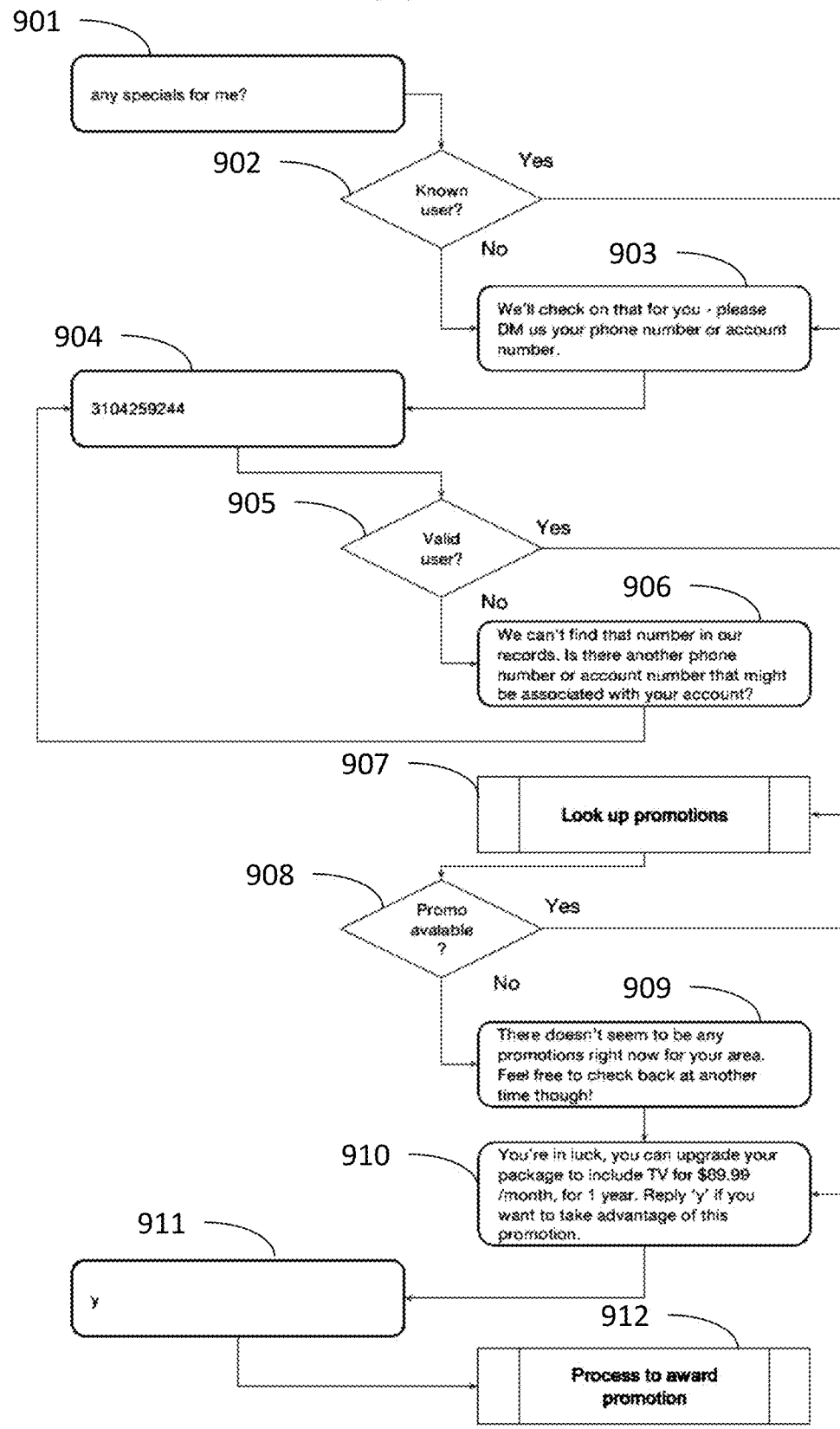
FIG. 9 shows a non-limiting example of a process flow diagram; in this case, a diagram illustrating the use case wherein a user inquires about specials available to them, and the query is resolved.

Referring to FIG. 9, in a particular embodiment, a user inquires about specials available to them, subsequent communications are conducted, and the query is resolved. The user provides a query such as "any specials for me?" 901. The algorithm processes the query and determines a response likely to resolve the query. However, more information is needed. Regardless of whether the user is known or not 902, the user is asked for identifying information such as, for example, a phone number or account number 903. If the user provides the identifying information 904, then the information is evaluated to determine if this is a valid user 905. If no, then different identifying information is requested 906 (e.g., another phone number or account number). Conversely, if this is a valid user, then the algorithm attempts to respond to the query by looking up promotions 907. If there are no promotions, then the algorithm provides a response indicating the lack of promotions 909. If there are promotions, then the algorithm provides a response 910 to the user containing information such as one or more of the promotion, price, duration, and an option to take advantage of the promotion immediately (e.g., by typing "y" or "yes"). If the user replies to take advantage of the promotion 911, then the algorithm proceeds to award the promotion 912.

Logic

In some embodiments, the platforms, systems, media, and methods described herein include features and logic to respond to user queries, or use of the same. For example, in a particular embodiment, an incoming query is processed by the application using an algorithm that extracts the most relevant data (e.g., tokenizing the message) and the application attempts to identify an answer likely to result in a resolution based on one or more of: 1) glossary look-up (i.e., this keyword or phrase means this intent and return this answer); 2) look-up or set data in an enterprise system (i.e., account status, order status, make reservation, etc.); 3) look-up in a knowledge base; 4) natural language processing; and 5) other AI. In some embodiments, the algorithm handles closed domain question answering. Closed domain question answering restricts the questions to a specific domain. For example, an example of a closed domain question answering algorithm deals with questions related to business/store locations, hours, menus, prices, and similar information. Alternatively, in some embodiments, the algorithm handles open domain question answering. Open domain question answering deals with open-ended questions on any subject matter and is not restricted to a particular knowledge base.

In further embodiments, if no answer likely to result in a resolution is identified, the application optionally escalates the query to a human agent and follows-up with the agent on the potential to automate responses to similar queries in the future. If an answer likely to result in a resolution is identified, the application optionally presents the answer to the customer. In still further embodiments, the application follows-up by asking the customer if their query is resolved.

In some embodiments, the platforms, systems, media, and methods described herein include features to create new responses to user queries and to modify established responses to user queries, e.g., curate responses. In further embodiments, curating responses to user queries comprises creating or editing one or more decision trees of logic. In still further embodiments, curating responses to user queries comprises creating or editing automated responses for messaging, for example, reply "a" for reservations, "b" for check-in, followed by making a selection from a menu of items.

In some embodiments, curating responses to user queries comprises segmenting the logic and responses based on customer status, for example, if the customer is a VIP, give an alternate set of responses or escalate to a human agent. In some embodiments, curating responses to user queries comprises identifying querying users and retrieving data pertaining to previous interactions between the user and the vendor. In further embodiments, curating responses comprises segmenting the logic and responses based on previous interactions, for example, if the customer has made a particular order in the recent past, ask them if they want to repeat their recent order.

In some embodiments, the platforms, systems, media, and methods described herein include features to curate responses that allow an administrator to test different responses to the same inquiry to determine which drives a better conversion/resolution. In further embodiments, the application offers analytics measuring efficacy of automated responses (e.g., average number of messages until next decision point, average number of messages until conversion, etc.) that are segmented in a variety of ways (e.g., which channel (FB vs. Twitter vs. SMS vs. WhatsApp). In some embodiments, the application provides an administrative interface displaying global analytics to allow an administrative user to evaluate the efficacy of automated responses. In some embodiments, the analytics provide information for one or more of the number of unique users, top inquiries, and the overall quality of the automated responses.

Figure 11:
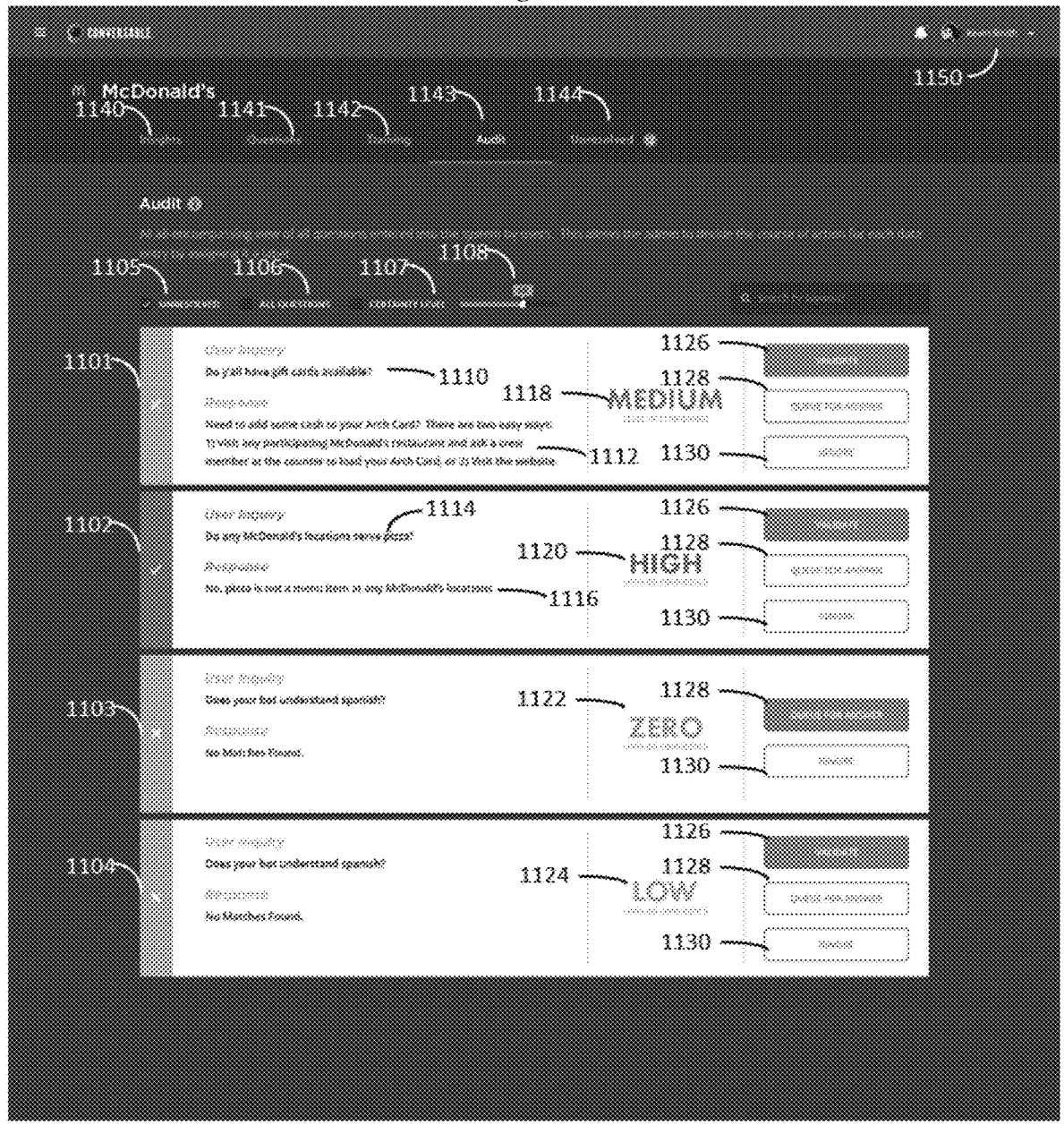
FIG. 11 shows a non-limiting example of an administrative interface displaying inquiries entered into the system by users.

Referring to FIG. 11, in a particular embodiment, an administrative interface displays inquiries entered into the system by users. The interface displays a list of inquiries for review by an administrator. In some embodiments, a user inquiry is assigned an automated response with a corresponding confidence level (e.g., zero, low, medium, high). In some embodiments, the interface provides the administrator with the ability to decide a course of action for a particular inquiry. For example, in some embodiments, the administrator chooses between validating the automated response for an inquiry, queuing the inquiry for an automated response, and ignoring the inquiry. In some embodiments, the interface provides one or more filtering options to narrow a selection of user inquiries. For examples, in some embodiments, the user inquiries are filtered according to resolution (resolved or unresolved) or confidence level (e.g., at least 10%, 20%, 30%, 40%, 50%, 60%, 70%, 80%, or 90% confidence). In particular, FIG. 11 shows an administrator login 1150 and various functions available for selection. The functions include an insights selection 1140, a questions selection 1141, a training selection 1142, an audit selection 1143, and an unresolved selection 1144. Currently, FIG. 11 depicts the interface following an audit selection 1143. Provided is a list of user inquiries (1101, 1102, 1103, 1104) each having a specific user question (e.g., 1110 or 1114) and a generated response (e.g., 1112 or 1116). Also included are confidence levels for the generated responses such as, for example, high confidence 1120, medium confidence 1118, low confidence 1124, or zero confidence 1122. Each user inquiry is associated with one or more options by the administrator such as, for example, validating the response 1128, queuing the user query for an answer 1128, and/or ignore 1130. Finally, the user interface provides options for sorting or filtering the list of user inquiries including selecting unresolved questions 1105, all questions 1106, or questions meeting a certainty threshold 1107 (e.g., confidence level). In some embodiments, the certainty threshold is optionally set using a slider 1108 by the administrative user.

Figure 12:
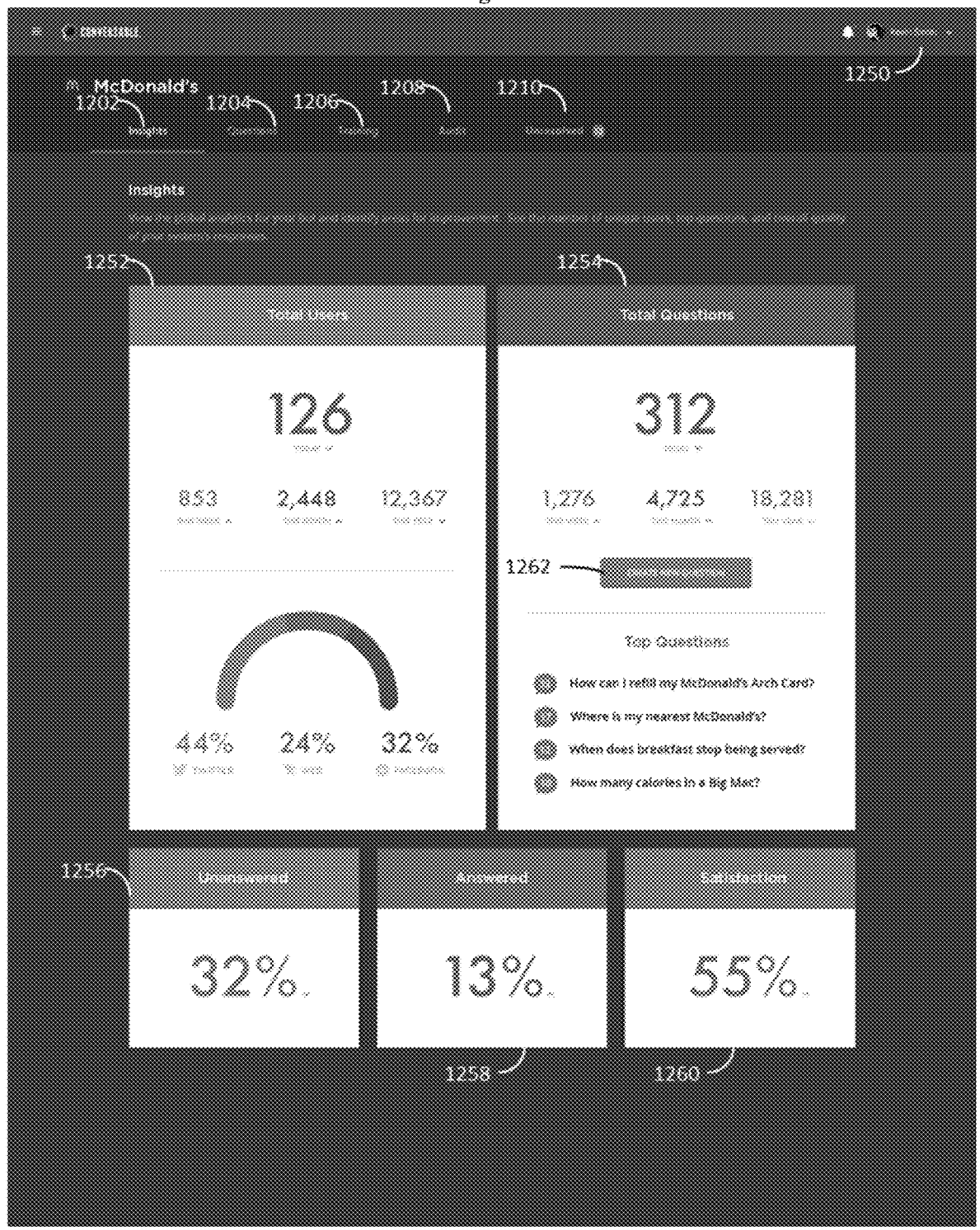
FIG. 12 shows a non-limiting example of an administrative interface displaying analytics for an administrator to evaluate the efficacy of automated responses, wherein additional options are expanded.

Referring to FIG. 12, in a particular embodiment, an administrator evaluates the efficacy of automated responses with additional options expanded and collapsed respectively. FIG. 12 shows an administrator login 1250 and various functions available for selection. The functions include an insights selection 1202, a questions selection 1204, a training selection 1206, an audit selection 1208, and an unresolved selection 1210. Currently, FIG. 12 depicts the interface following an insights selection 1202. In some embodiments, the interface provides user analytics 1252 including at least one of the total number of unique users during a time period (e.g., this week, month, or year), the platform or source of users (e.g., percentage from Twitter, Facebook, or web), and/or question analytics 1254 including the total number of user questions or inquiries during a time period (e.g., this week, month, or year), top questions (e.g., most commonly asked questions), and the resolution of the questions (e.g., percent answered 1256 or unanswered 1258, and percent satisfaction 1260).

Figure 13A:
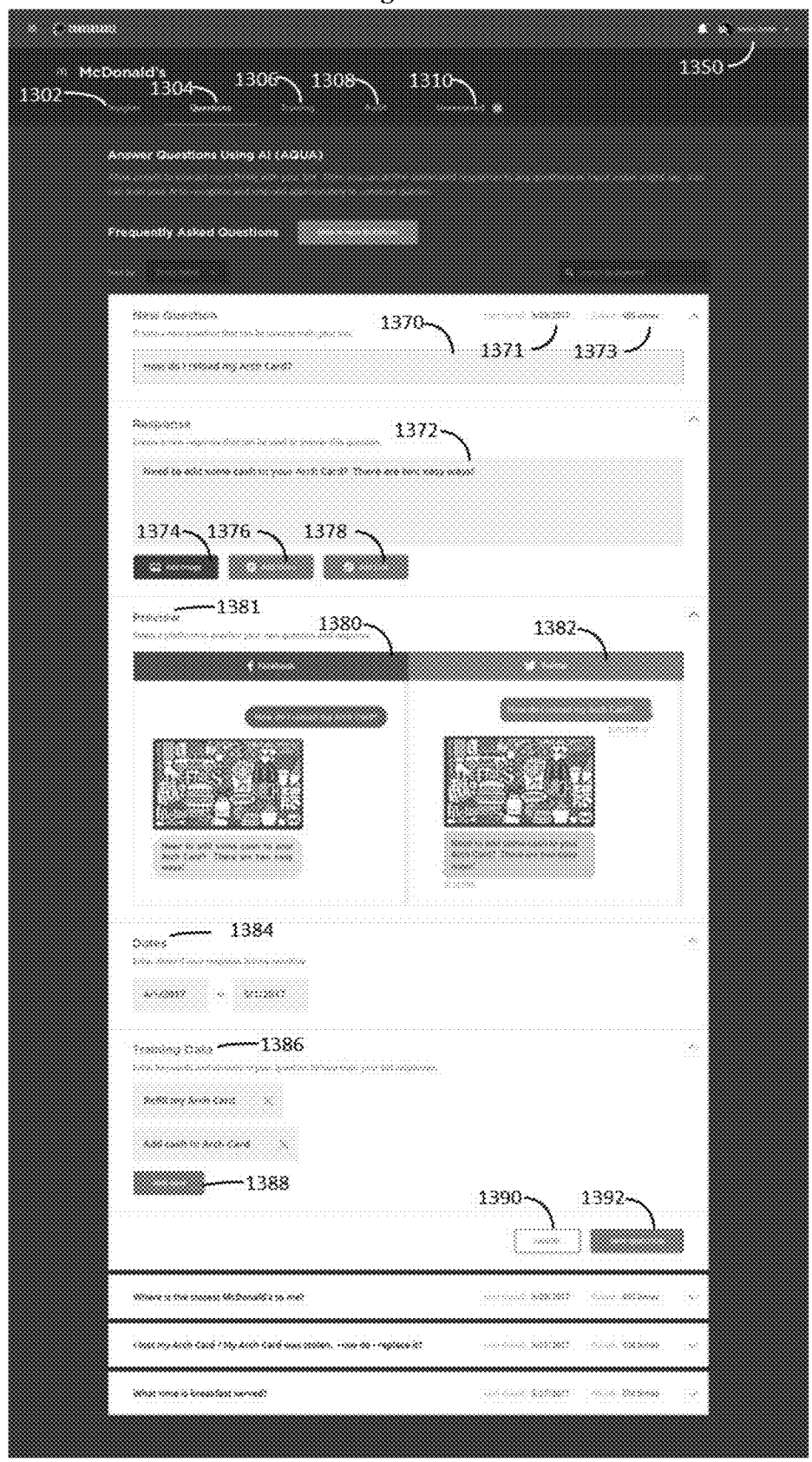
FIGS. 13A and 13B show non-limiting examples of an administrative interface allowing an administrator to define an automated response to a user inquiry with additional options expanded or collapsed.
Figure 13B:
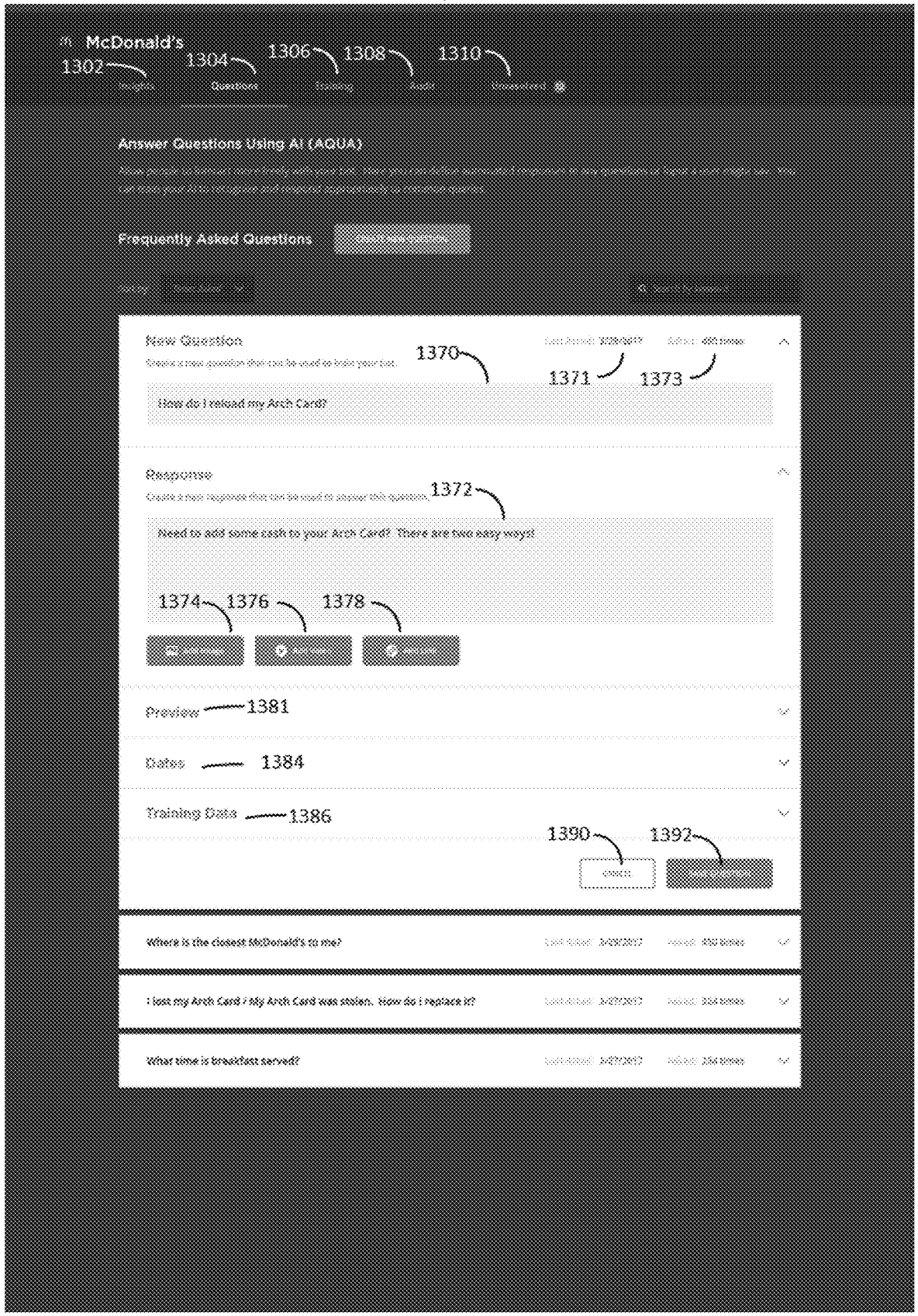

Referring to FIGS. 13A and 13B, in a particular embodiment, an administrator defines an automated response to a user inquiry with additional options expanded or collapsed. Included in the interface is an administrator login 1350 and various functions available for selection. The functions include an insights selection 1302, a questions selection 1304, a training selection 1306, an audit selection 1308, and an unresolved selection 1310. Currently, FIGS. 13A and 13B depict the interface following a questions selection 1304. In some embodiments, the interface provides the option to create a new question 1370 and define an automated response to the question 1372. Data for the particular question is provided, in some embodiments, showing when the question was last asked 1371 and/or how many times the question was asked 1373. The interface also depicts icons for adding image(s) 1374, video(s) 1376, and/or link(s) 1378 to the response. In some embodiments, the interface allows the question and response to be previewed 1381 based on a particular platform such as, for example, Facebook 1380 or Twitter 1382. In some embodiments, additional options include a date section 1384 allowing the administrator to set a date or time range in case the response is time sensitive. In some embodiments, additional options include a training data section 1386 allowing the administrator to add keywords and/or variants of the question 1388 to help train the algorithm to provide automated responses. Finally, the administrator is provided with buttons for canceling 1390 the new question or saving the new question 1392. FIG. 13A depicts the UI with the preview 1381, date section 1384, and the training data section 1386 expanded, while FIG. 13B depicts the UI with these options collapsed.

Figure 14A:
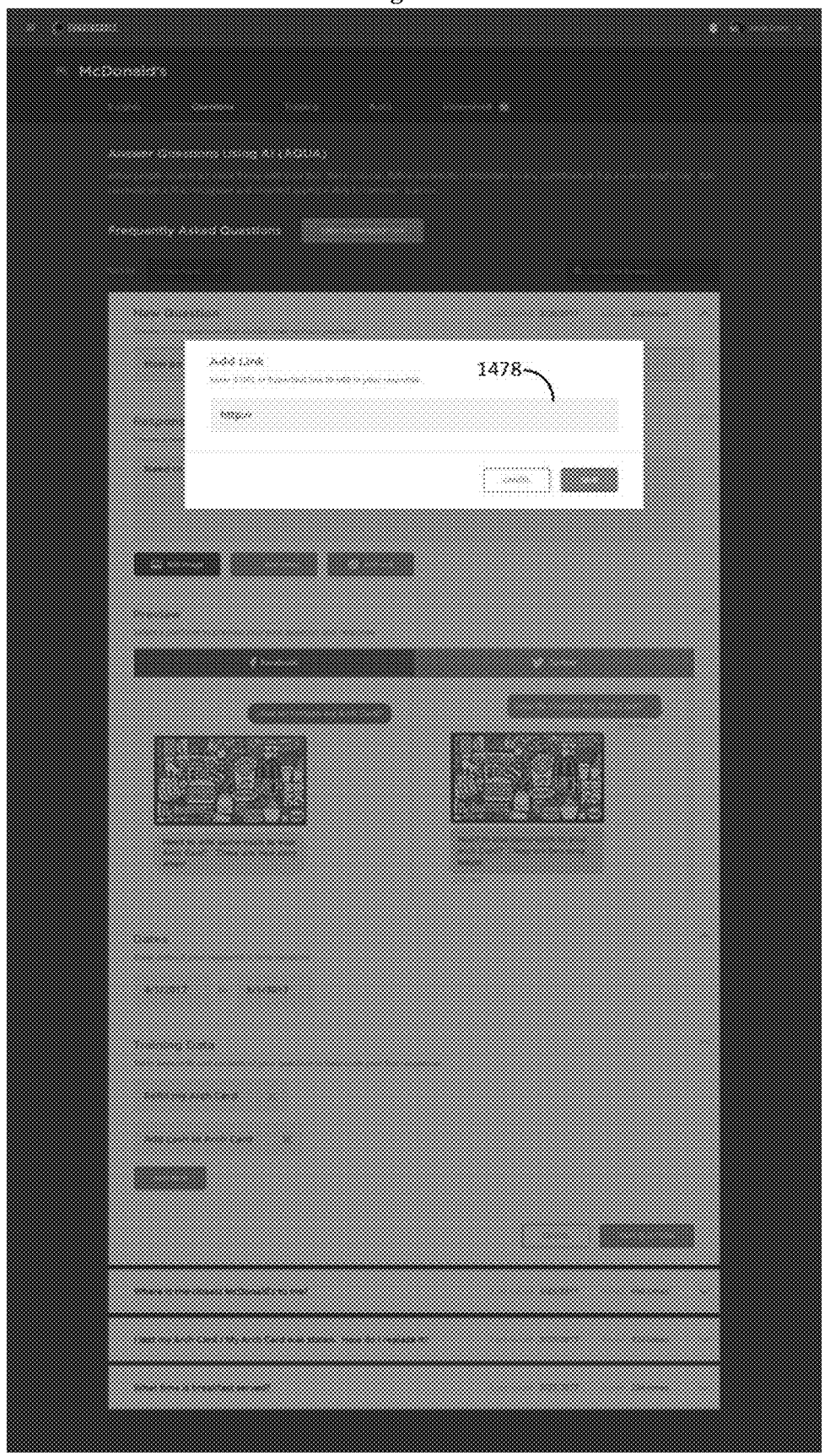
FIGS. 14A, 14B, and 14C show non-limiting examples of an administrative interface allowing an administrator to define an automated response to a user inquiry by including a web link, a video, and/or an image.
Figure 14B:
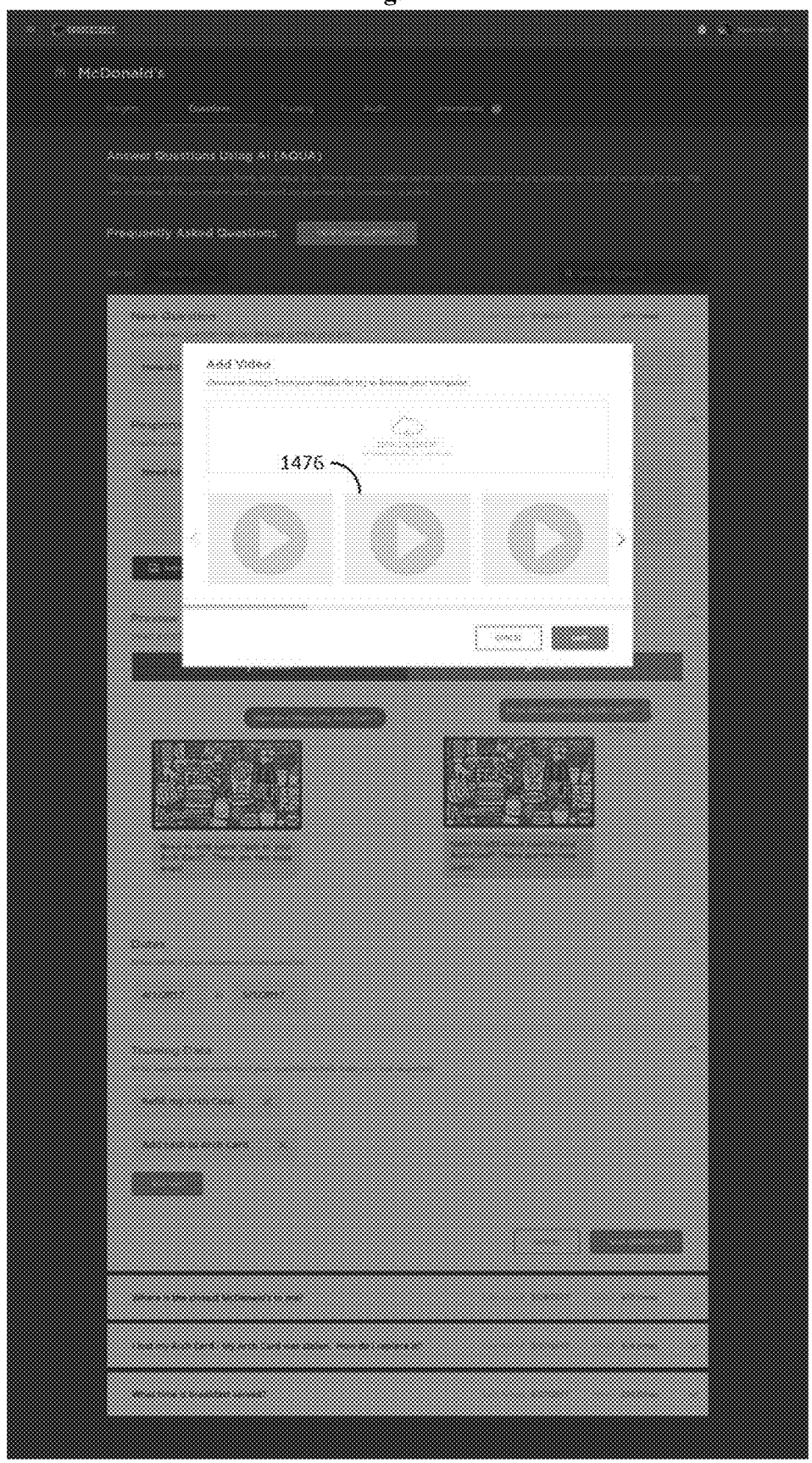
Figure 14C:
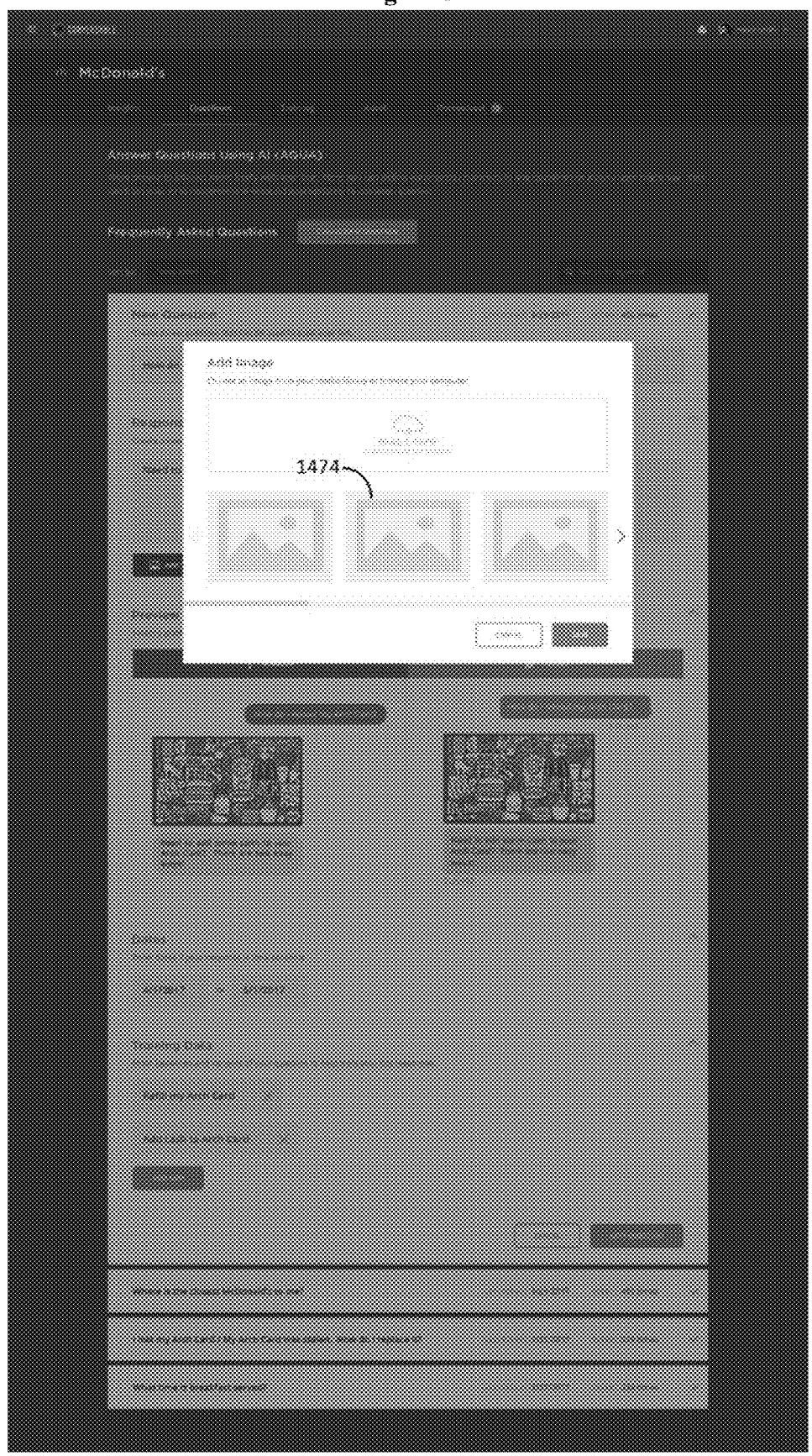

Referring to FIGS. 14A, 14B, and 14C, in a particular embodiment, an administrator defines an automated response to a user inquiry by including a web link, a video, and/or an image. FIG. 14A shows one embodiment of the interface after an administrator has selected the add link icon (e.g., 1378). A window 1478 is provided for the administrator to enter a link. FIG. 14B shows one embodiment of the interface after an administrator has selected the add video icon (e.g., 1376). A window 1476 is provided for the administrator to enter one or more videos. FIG. 14C shows one embodiment of the interface after an administrator has selected the add image icon (e.g., 1374). A window 1474 is provided for the administrator to enter one or more images.

Figure 15:
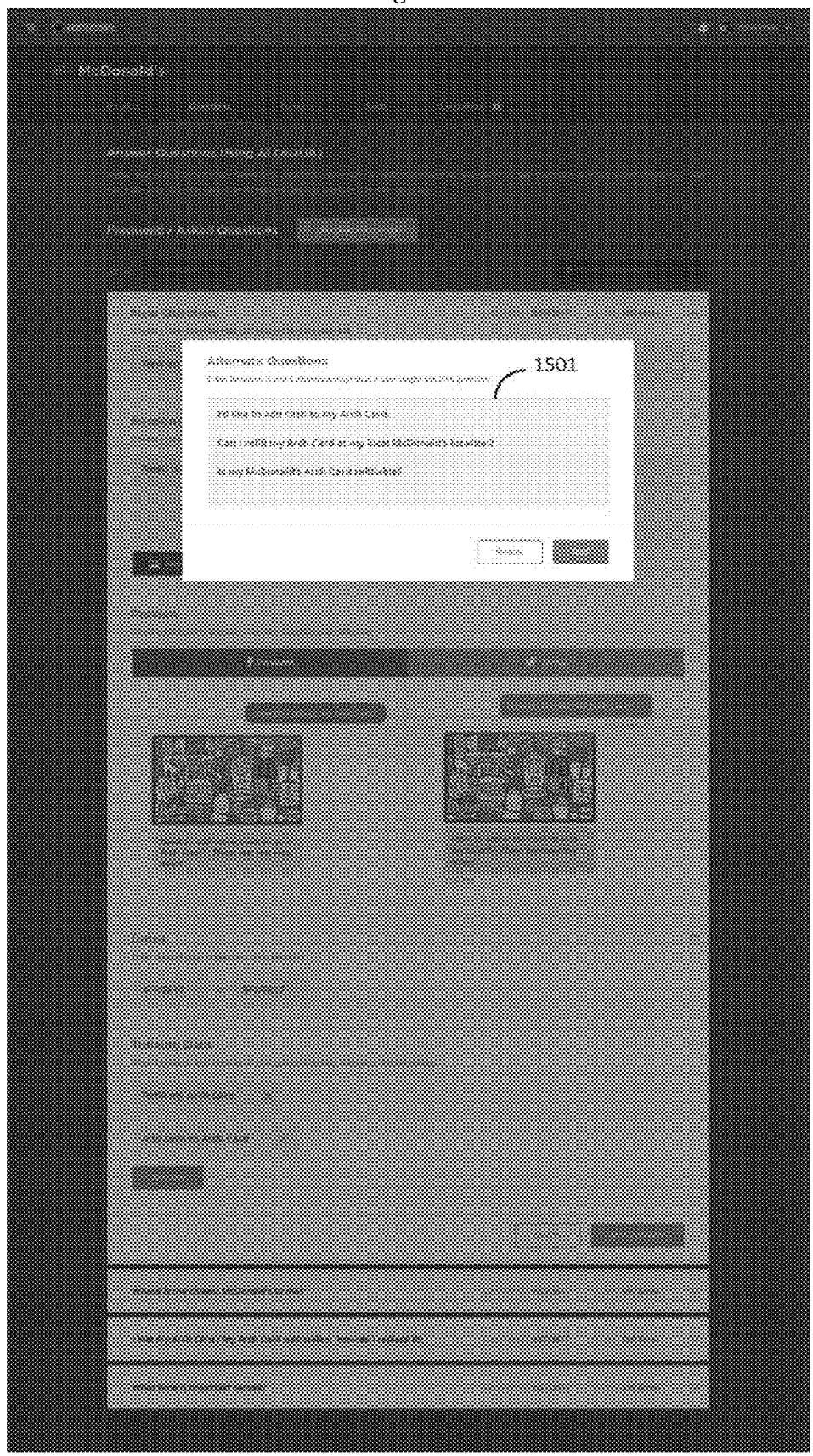
FIG. 15 shows a non-limiting example of an administrative interface allowing an administrator to train an automated response to a user inquiry by adding additional ways a user may ask an inquiry.

Referring to FIG. 15, in a particular embodiment, an administrator trains an algorithm for providing an automated response to a user inquiry by adding additional ways a user may ask an inquiry. This information helps the algorithm learn to identify user inquiries that are worded differently but are seeking the same information or response. FIG. 15 shows one embodiment of the interface after an administrator has selected the icon for adding new keywords or alternative questions (e.g., 1388) for training the algorithm. A window 1501 is provided for the administrator to enter one or more alternative ways in which a user may ask the question. By providing alternative questions that ask the same thing, the administrator helps build upon a set of alternative questions for a given question. As a result, providing the algorithm with a larger question set enhances the training of said algorithm for accurately processing, parsing, interpreting, and/or responding to user queries.

Figure 16A:
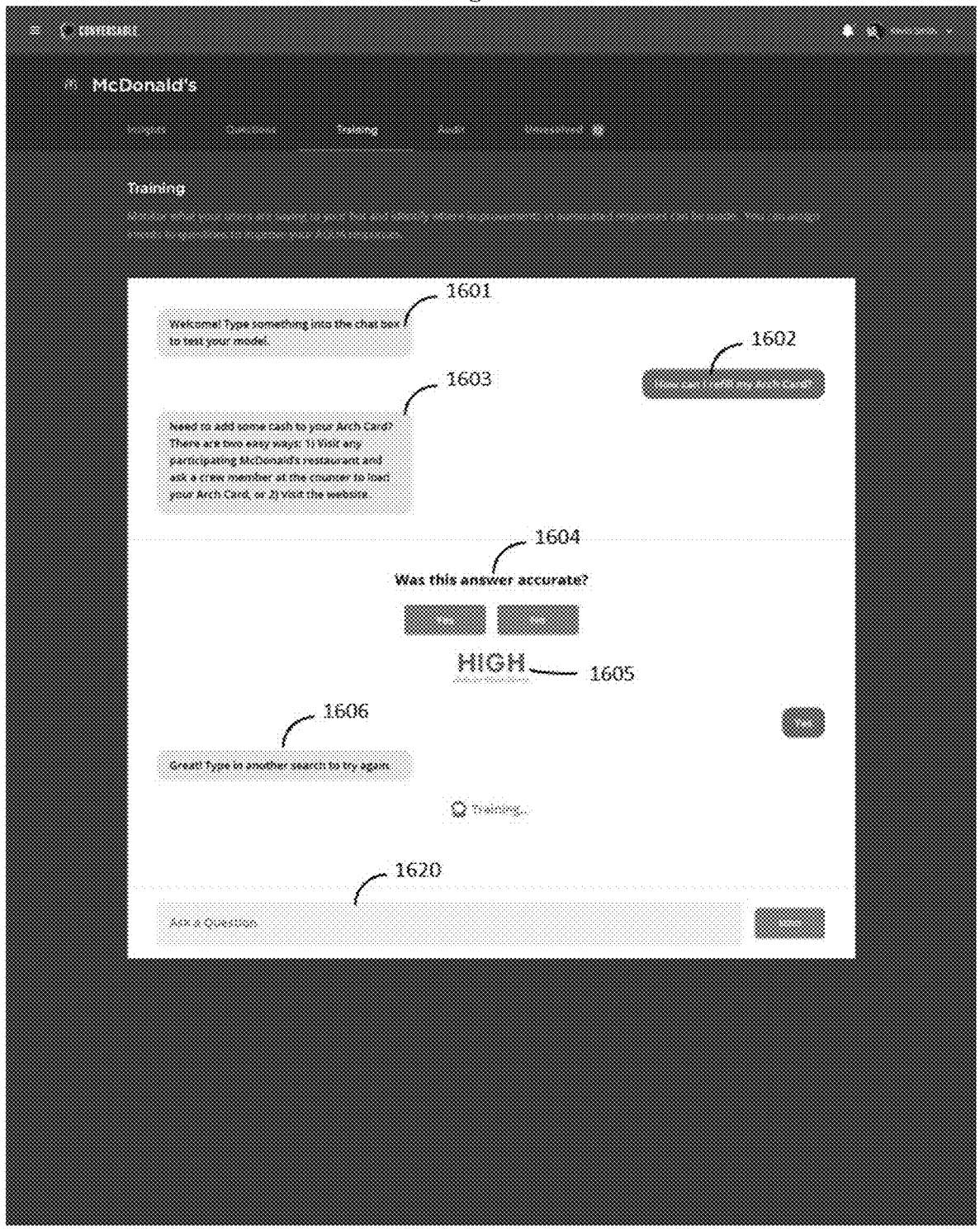
FIGS. 16A and 16B shows non-limiting examples of an administrative interface allowing an administrator to monitor and/or test user inquiries and automated responses.
Figure 16B:
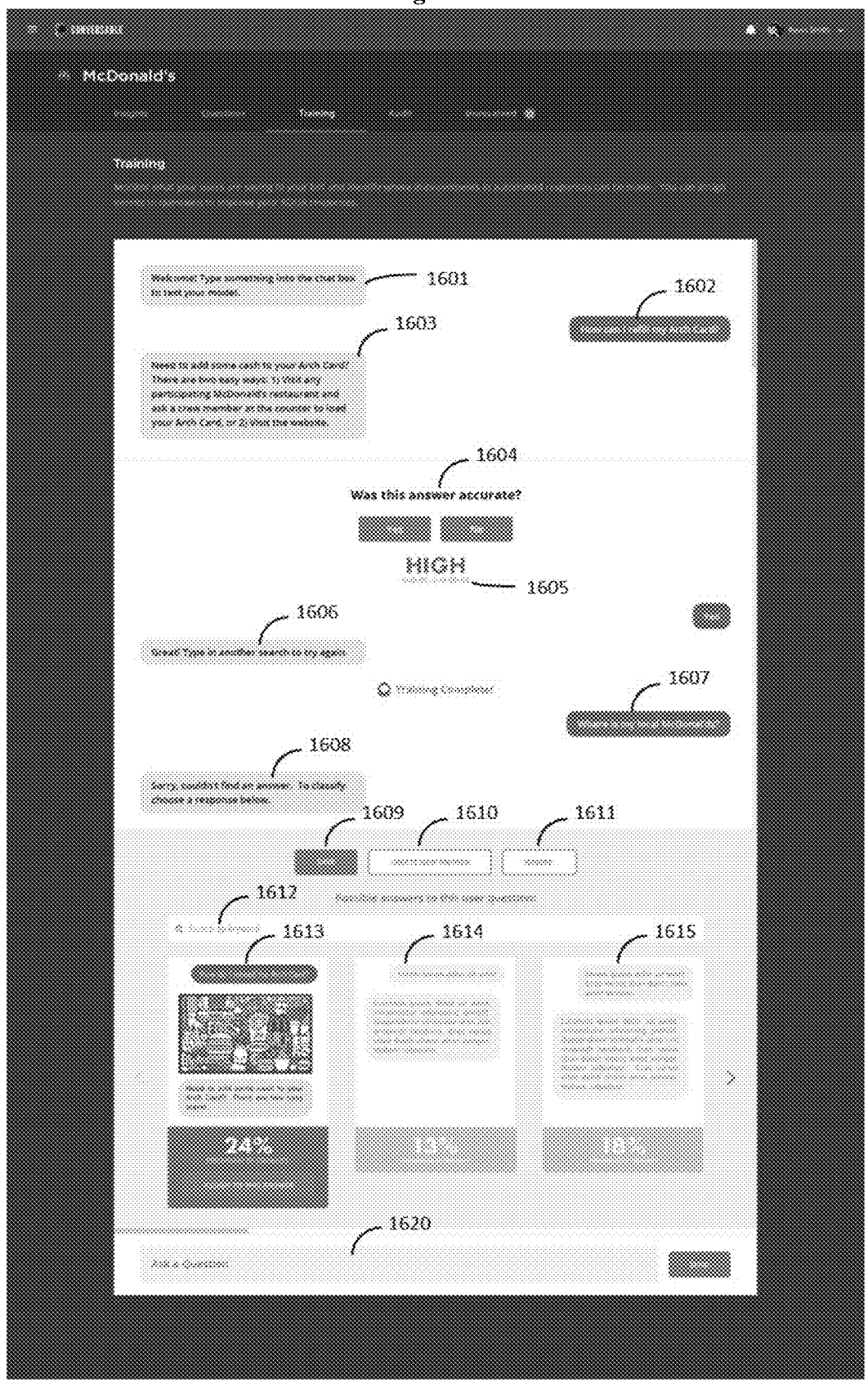

Referring to FIGS. 16A and 16B, in a particular embodiment, an administrator monitors and/or tests user inquiries and automated responses. The administrator enters a question and is provided with an automated response. The administrator then rates the response for accuracy. In some embodiments, the administrator continues asking questions. For example, FIGS. 16A and 16B show a prompt 1601 from the software application to ask a question. The administrator then enters a question 1602 such as "how can I refill my Arch Card?" The algorithm processes the question and provides a response 1603 informing the administrator of various ways to add cash to the Arch Card. The administrator is then provided with an option to provide feedback 1604 such as, for example, selecting yes or no for whether the response is accurate. In addition, a confidence level 1605 for the response is provided (e.g., high in this case due to the simplicity of the question). Next, in some embodiments, the administrator is prompted to provide another question 1606 by entering it into the text box 1620. If the administrator enters another question 1607 such as, for example, "where is my local McDonald's?" then the algorithm processes the question and attempts to provide a response. In the event that an appropriate response cannot be found, a response indicating an answer could not be found is provided 1608. The administrator has the option to search for an answer (e.g., from a database) by entering a search term in the search box 1612. In some embodiments, the response 1608 also instructs the administrator to select an appropriate response. For example, in this embodiment, three responses are provided (1613, 1614, and 1615) with varying confidence levels (24% certainty, 13% certainty, and 18% certainty respectively). The administrator is able to choose a response for this question, which further trains the algorithm. For example, the algorithm is unable to select an appropriate response based on no response exceeding a minimum confidence threshold (e.g., a minimum percentage), but the administrator selects a response below this threshold as being an appropriate response. In this case, the algorithm then learns from the administrator's action and adjusts its calculated confidence level for various responses accordingly.

Figure 17:
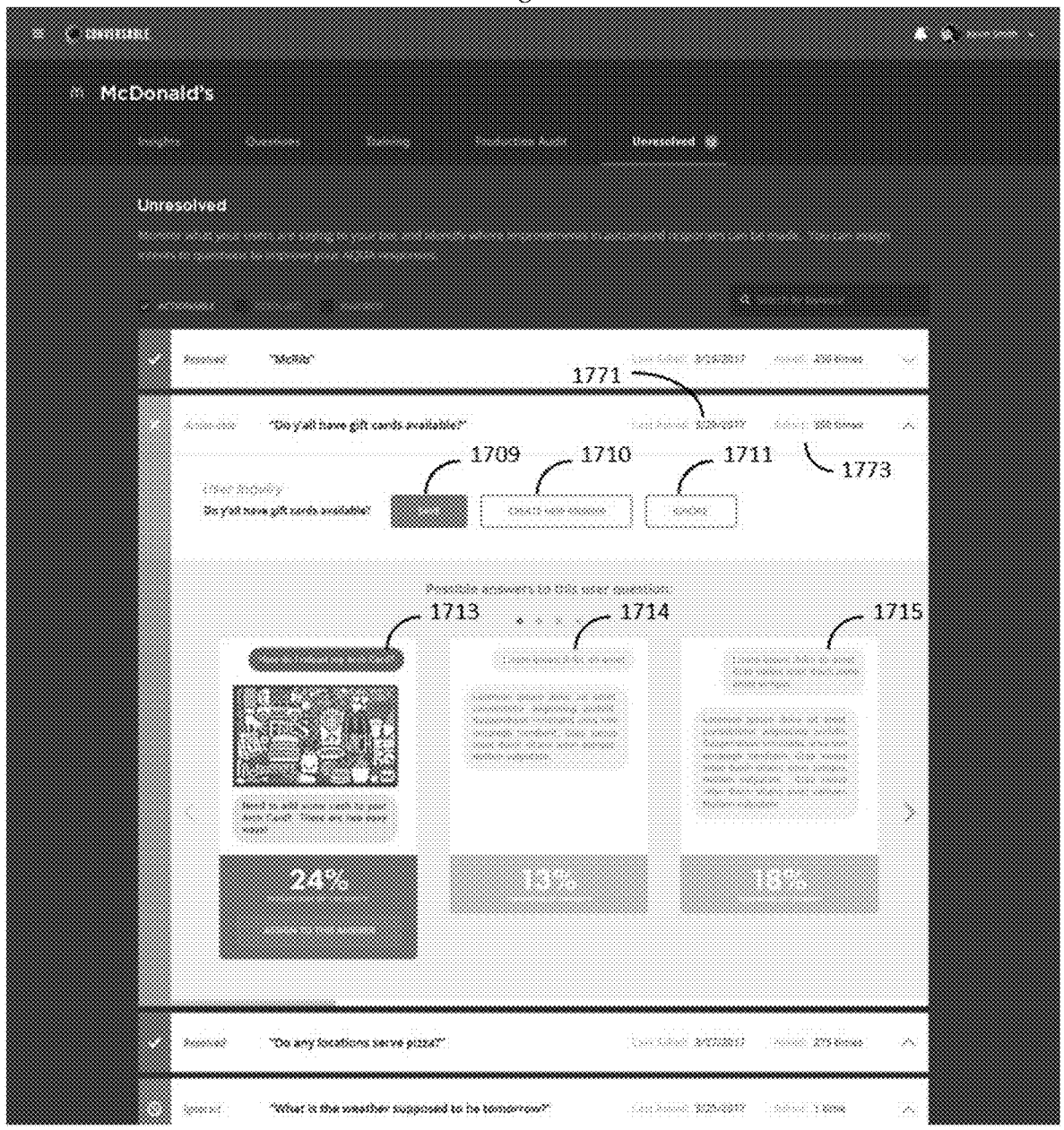
FIG. 17 shows a non-limiting example of an administrative interface allowing an administrator to monitor, evaluate, and resolve user inquiries.

Referring to FIG. 17, in a particular embodiment, an administrative interface allows an administrator to monitor, evaluate, and resolve user inquiries. In this case, the administrator has selected the unresolved selection (e.g., 1144) to locate unresolved questions/queries. The unresolved selection allows the administrator to monitor what the users are saying to the application (e.g., automated response bot) and identify where improvements in automated responses can be made. Moreover, the administrator is able to assign intent(s) to questions to improve the algorithm(s). In some embodiments, when the algorithm is unable to generate an automated response to a question, the administrator optionally classifies the question by choosing an automated response from a selection of the closest (e.g., highest confidence) automated responses (1713, 1714, 1715) provided by the algorithm. The interface provides the administrator with the option to save 1709, create new question 1710, or ignore 1711 the unresolved inquiry. Additional information is provided such as the date when the question was last asked 1771 and/or the number of times the question has been asked 1773.

Automation

In some embodiments, the platforms, systems, media, and methods described herein include features to automate responses to user queries, or use of the same. For example, in some embodiments, the application applies machine logic and learning algorithms to automate responses to user queries. In some embodiments, the application applies a first machine learning algorithm to monitored communications to identify one or more queries susceptible to response automation. In further embodiments, the application applies a second machine learning algorithm to the queries susceptible to response automation to identify one or more responses likely to resolve the query. In still further embodiments, the application automatically responds to a customer query with one or more responses identified as likely to resolve the query.

In some embodiments, automating response to user queries comprises identifying a response likely to resolve the query based on customer status, for example, whether the customer is a VIP. In some embodiments, automating response to user queries comprises identifying a response likely to resolve the query based on user identity and data pertaining to previous interactions between the user and the vendor. In further embodiments, a response likely to resolve the query is identified based on data pertaining to previous interactions.

Once a response likely to resolve the query is identified, in some embodiments, the application notifies a human agent and alerts them to respond to the query with one or more responses likely to resolve the query. In further embodiments, the application provides suggested responses to the human agent. In other embodiments, once a response likely to resolve the query is identified, the application instantiates an autonomous software agent to respond to similar queries with the responses likely to resolve the query. In some embodiments, administrative users are able to curate (e.g., create, delete, edit, prioritize, etc.) the notifications and/or instantiated autonomous software agents via an admin tool.

Integration

In some embodiments, the platforms, systems, media, and methods described herein integrate with third-party systems. On the data ingestion and monitoring side, in some embodiments, the application offers a plurality of APIs allowing seamless integration with a plurality of electronic communication platforms including any and all that consumers may use to initiate queries to a vendor. Many communication systems are suitable for integration. Suitable communication systems include, by way of non-limiting examples, Twitter, Facebook, SMS, Apple Siri, and Amazon Echo.

On the response and resolution side, in some embodiments, the application offers a plurality of APIs allowing seamless integration with enterprise systems including any and all that a vendor may use to offer consumer services. Many enterprise systems are suitable for integration. Suitable enterprise systems include, by way of non-limiting examples, ordering systems, fulfillment systems, delivery systems, authentication systems, calendaring systems, reservations systems, CRM systems, and knowledgebase systems. In further embodiments, the application integrates with consumer delivery apps, such as Postmates, Favor, Doordash, and other delivery apps. In still further embodiments, the application integrates with consumer concierge apps, such as Assist and other concierge apps.

Figure 10:
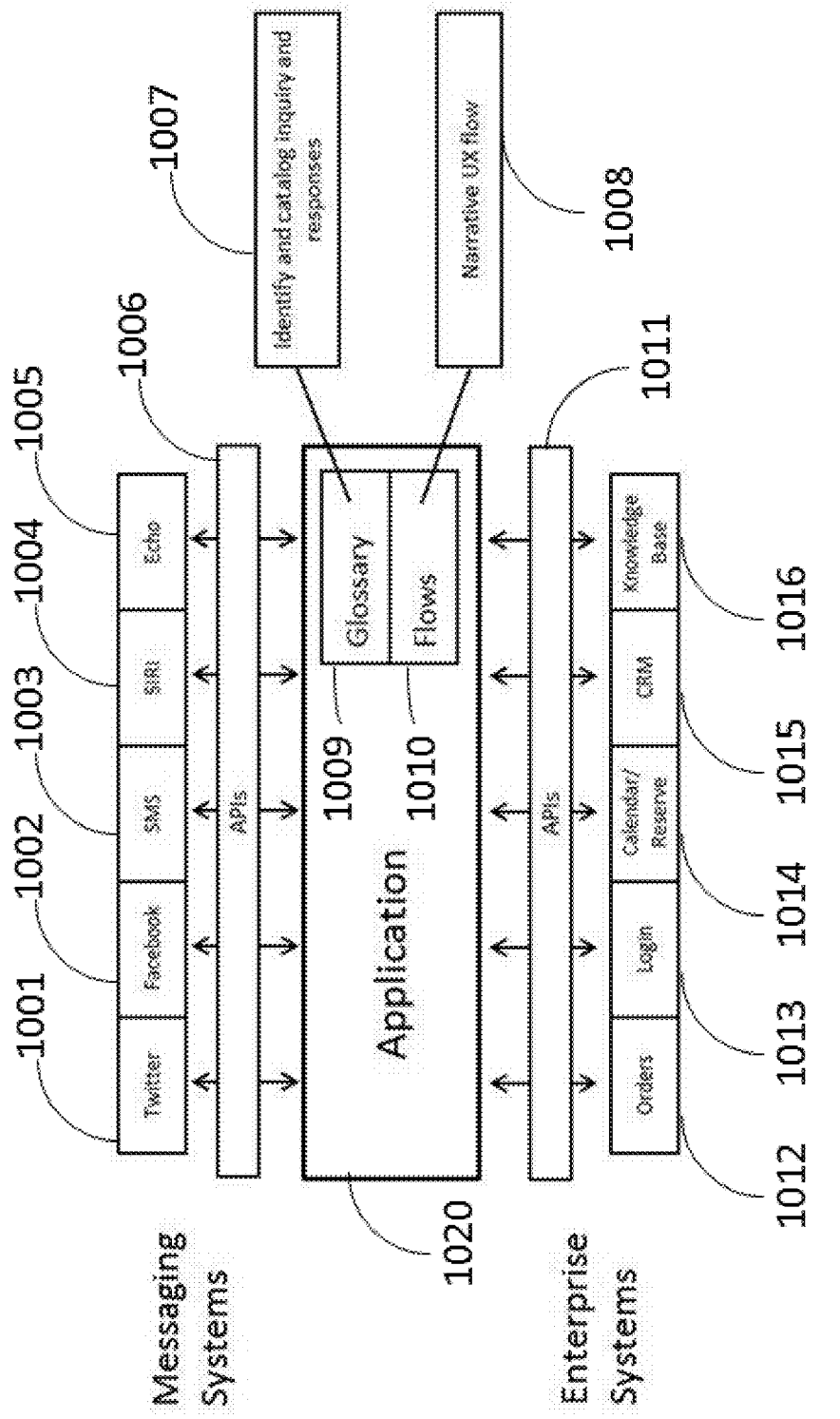
FIG. 10 shows a non-limiting example of a software architecture block diagram; in this case, an architecture where the application exposes a first set of APIs to receive user interactions from a variety of external communications platforms and exposes second set of APIs to pass the results of automated conversations to one or more aspects of enterprise software systems.

Referring to FIG. 10, in a particular embodiment, the application, which includes machine logic in the form of glossaries 1009 to identify and catalog terms in queries and responses 1007 and flowcharts 1010 to create narrative UX flows 1008, acts as "middleware" sitting between third-party messaging systems and vendor enterprise systems. In this embodiment, the application 1020 interacts with both the third-party messaging systems and the vendor enterprise systems via a suite of API adaptors (1006, 1011). Further, in this embodiment, the application 1020 monitors and intercepts consumer queries coming in from all messaging-capable social and communication systems utilized by the vendor and passes results and query resolution data to enterprise systems utilized by the vendor to provide consumer services. In some embodiments, the social and communication systems include one or more of Twitter 1001, Facebook 1002, SMS 1003, SIRI 1004, and Echo 1005. In some embodiments, the application 1020 interfaces with enterprise systems to obtain relevant information such as orders 1012, login 1013, calendar/reserve 1014, CRM 1015, or knowledge base 1016 for helping resolve consumer queries.

In some embodiments, the platforms, systems, media, and methods described herein provide an application that integrates with vendor enterprise software systems such that when a user interacts with the vendor, the application retrieves and utilizes enterprise data from those systems to resolve the user's queries. In further embodiments, the enterprise data, responses to queries that utilize enterprise data, and the users' interactions with the application in reaction to those responses are integrated into machine learning models to understand when queries are likely to be resolved with what enterprise data and which data are likely to efficiently resolve particular queries. In some embodiments, the machine learning model uses natural language processing to parse, interpret, and identify responses for customer queries. In some embodiments, the machine learning model uses a decision tree as a predictive model. For example, in some embodiments, the decision tree comprises a list of all possible responses for a query, and the model arrives at the appropriate response based on the input variables from the query (e.g., relevant keywords or phrases). The decision tree comprises internal nodes, wherein each node represents a test on some input variable. An illustrative example of an internal node in the decision tree is the question type (e.g., "where" indicating a location question type) that allows the decision tree to progress to the next node branching off from the previous one. In some embodiments, machine learning is accomplished by training the algorithm on training data to pick splits at the nodes in the tree. In some embodiments, the model is trained using sets of user queries and appropriate responses to said queries. In some embodiments, an administrative user provides additional query/response sets for training the model.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 18:
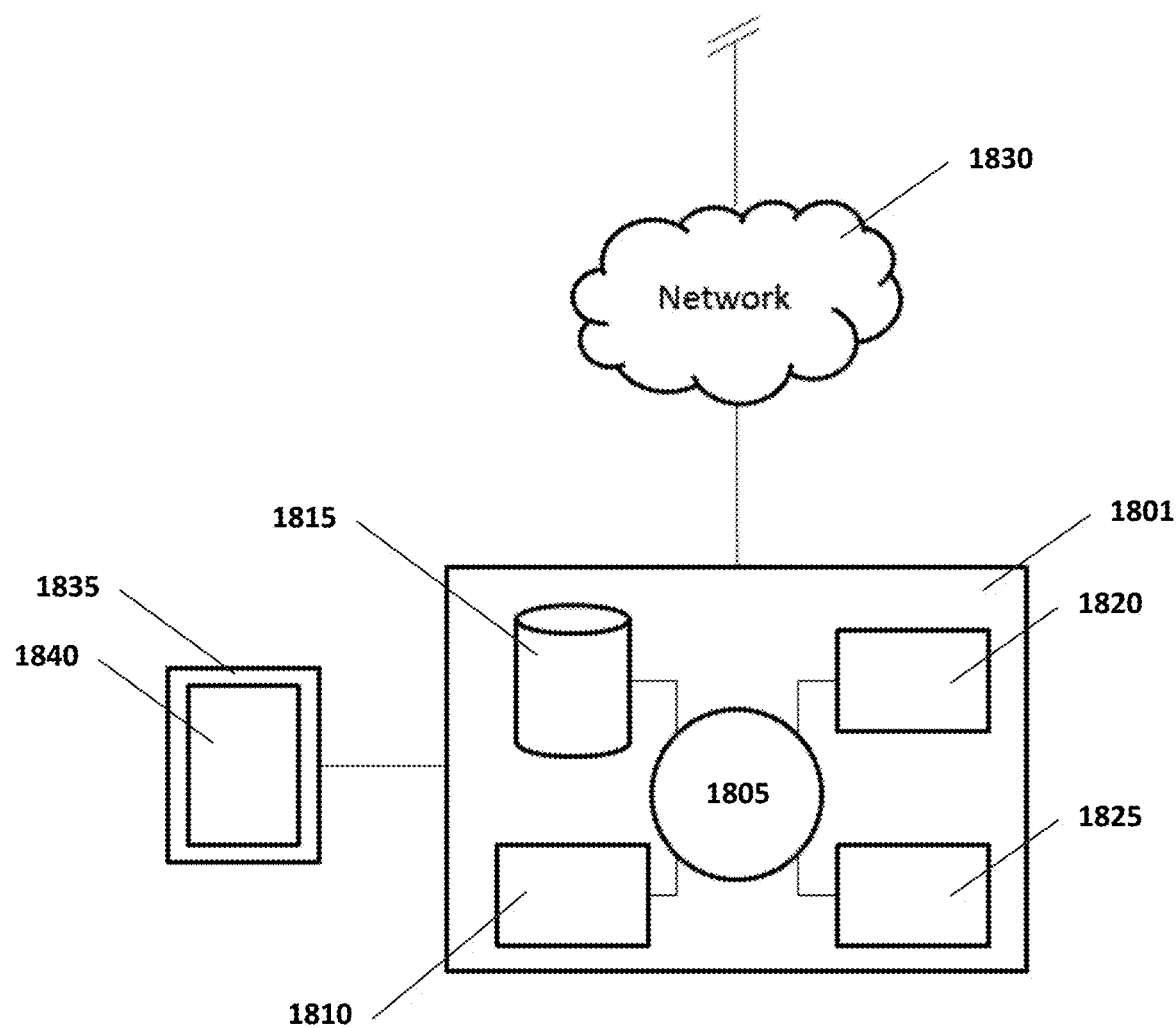
FIG. 18 shows a non-limiting example of a digital processing device; in this case, a device with one or more CPUs, a memory, a communication interface, and a display.

Referring to FIG. 18, in a particular embodiment, an exemplary digital processing device 1801 is programmed or otherwise configured to monitor electronic communications and automate responses to queries. The device 1801 can regulate various aspects of interactive chat of the present disclosure, such as, for example, applying machine learning algorithms and generating automated response bots. In this embodiment, the digital processing device 1801 includes a central processing unit (CPU, also "processor" and "computer processor" herein) 1805, which can be a single core or multi core processor, or a plurality of processors for parallel processing. The digital processing device 1801 also includes memory or memory location 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The digital processing device 1801 can be operatively coupled to a computer network ("network") 1830 with the aid of the communication interface 1820. The network 1830 can be the Internet, an internet and/or extranet, or an intranet and/or extranet that is in communication with the Internet. The network 1830 in some cases is a telecommunication and/or data network. The network 1830 can include one or more computer servers, which can enable distributed computing, such as cloud computing. The network 1830, in some cases with the aid of the device 1801, implements a peer-to-peer network, which enables devices coupled to the device 1801 to behave as a client or a server. In some embodiments, the digital processing device 1801 includes a display 1835 with a graphical user interface (GUI) 1840. For example, in some embodiments, an administrator is able to interact with the digital processing device 1801 via the display 1835 and GUI 1840 to review, configure, and add question/answer sets (see, e.g., FIGS. 11-17).

Continuing to refer to FIG. 18, the CPU 1805 can execute a sequence of machine-readable instructions, which can be embodied in a program or software. The instructions may be stored in a memory location, such as the memory 1810. The instructions can be directed to the CPU 1805, which can subsequently program or otherwise configure the CPU 1805 to implement methods of the present disclosure. Examples of operations performed by the CPU 1805 can include fetch, decode, execute, and write back. The CPU 1805 can be part of a circuit, such as an integrated circuit. One or more other components of the device 1801 can be included in the circuit. In some cases, the circuit is an application specific integrated circuit (ASIC) or a field programmable gate array (FPGA).

Continuing to refer to FIG. 18, the storage unit 1815 can store files, such as drivers, libraries and saved programs. The storage unit 1815 can store user data, e.g., user preferences and user programs. The digital processing device 1801 in some cases can include one or more additional data storage units that are external, such as located on a remote server that is in communication through an intranet or the Internet.

Continuing to refer to FIG. 18, the digital processing device 1801 can communicate with one or more remote computer systems through the network 1830. For instance, the device 1801 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 1801, such as, for example, on the memory 1810 or electronic storage unit 1815. The machine executable or machine readable code can be provided in the form of software. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft Silverlight®, Java™, and Unity®.

Figure 19:
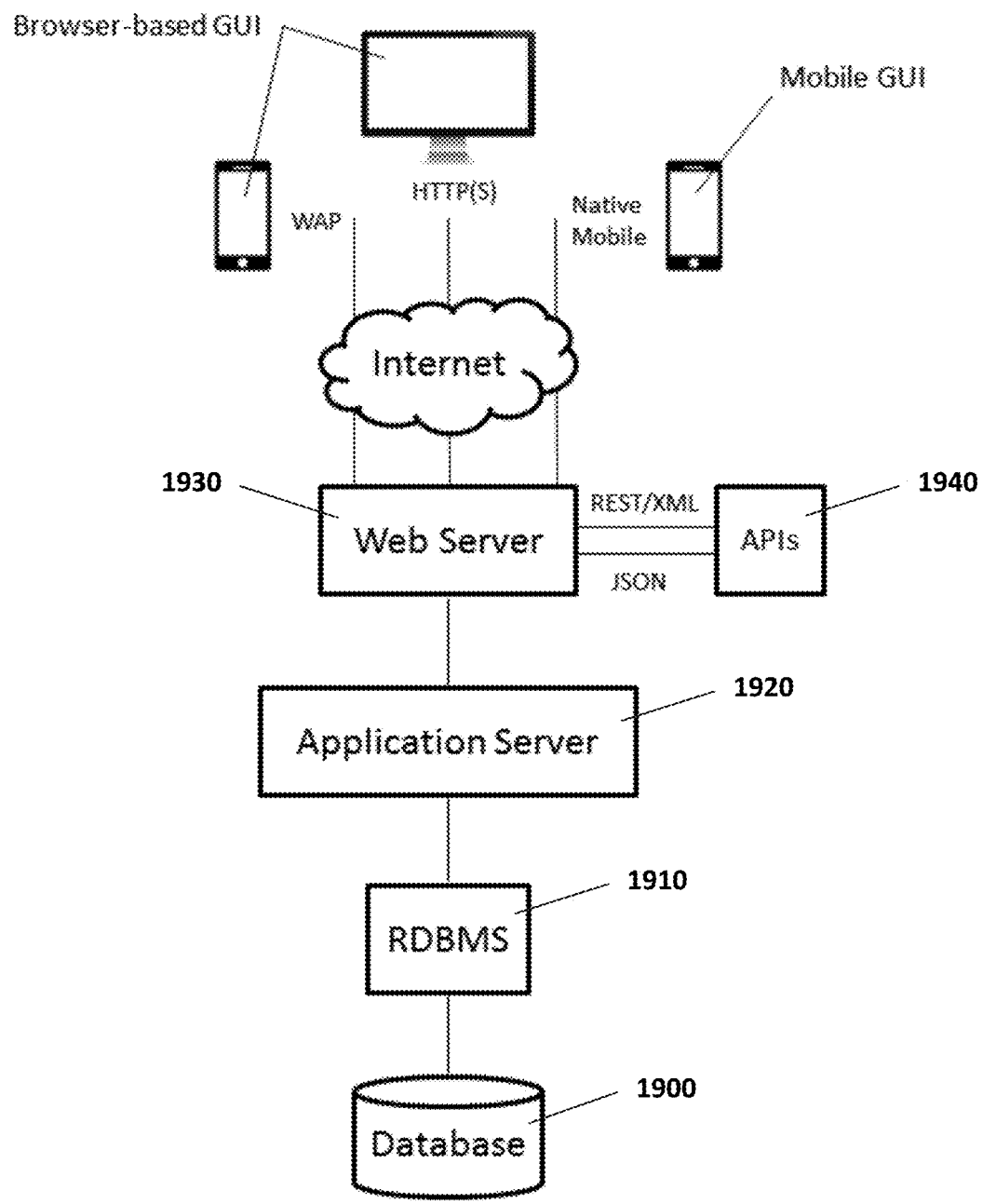
FIG. 19 shows a non-limiting example of a web/mobile application provision system; in this case, a system providing browser-based and/or native mobile user interfaces.

Referring to FIG. 19, in a particular embodiment, an application provision system comprises one or more databases 1900 accessed by a relational database management system (RDBMS) 1910. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1920 (such as Java servers, .NET servers, PHP servers, and the like) and one or more web servers 1930 (such as Apache, IIS, GWS and the like). The web server(s) optionally expose one or more web services via app application programming interfaces (APIs) 1940. Via a network, such as the Internet, the system provides browser-based and/or mobile native user interfaces.

Figure 20:
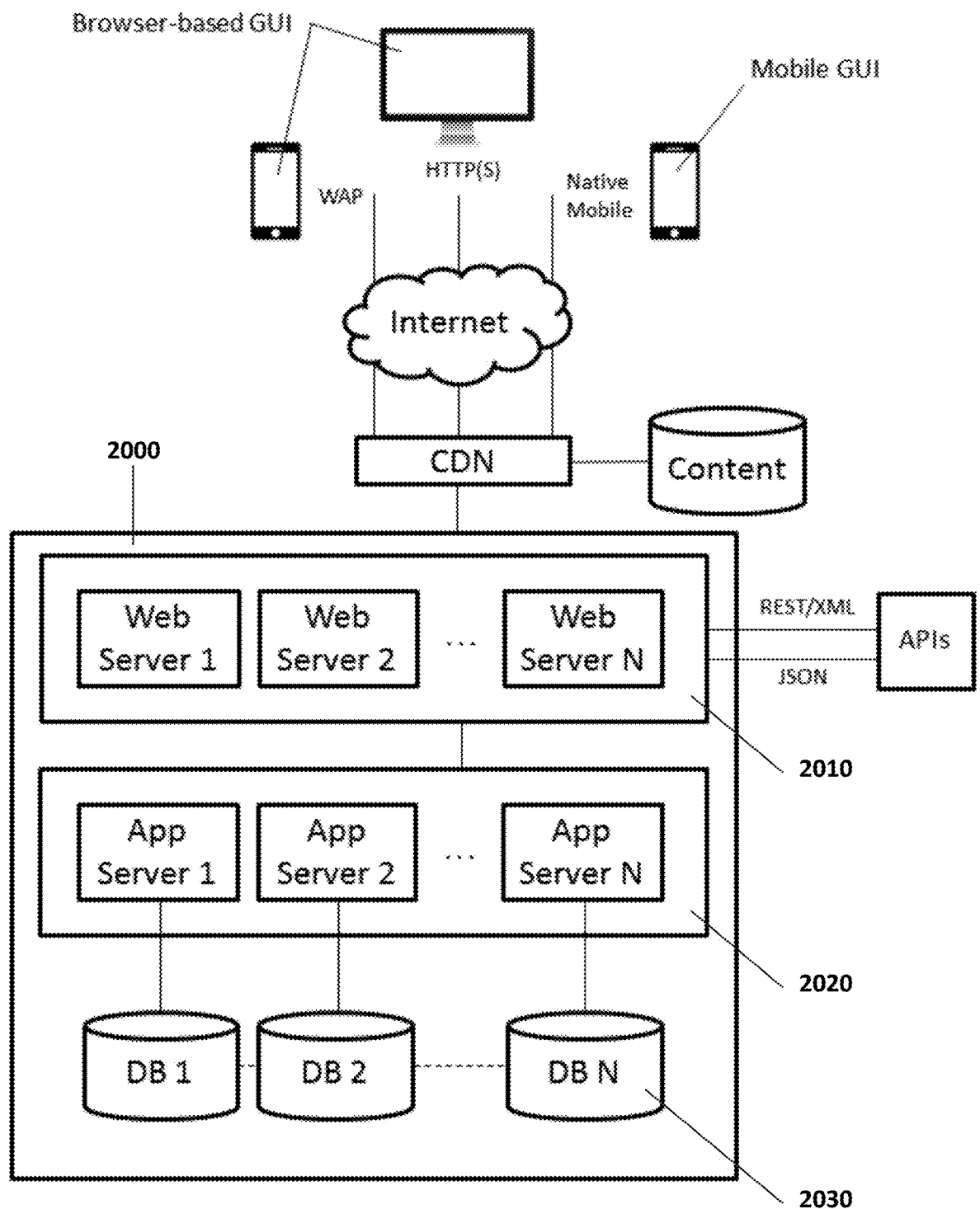
FIG. 20 shows a non-limiting example of a cloud-based web/mobile application provision system; in this case, a system comprising an elastically load balanced, auto-scaling web server and application server resources as well as synchronously replicated databases.

Referring to FIG. 20, in a particular embodiment, an application provision system alternatively has a distributed, cloud-based architecture 2000 and comprises elastically load balanced, auto-scaling web server resources 2010 and application server resources 2020 as well synchronously replicated databases 2030.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of user, chat, query, and response information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented method, comprising:
   monitoring, by a computing device, an enterprise system by using an API to interact with enterprise data corresponding to user interactions with the enterprise system, wherein the user interactions have corresponding user interaction data, wherein the computing device includes a query-detection machine-learning model and a resolution machine-learning model, and wherein the query-detection machine-learning model is a distinct machine-learning model from the query-detection machine-learning model;
integrating the enterprise data and the user interaction data into a query-detection machine-learning model;
detecting input to the enterprise system;
identifying a query in the input using the query-detection machine-learning model and the input;
executing a resolution machine-learning model using the query, wherein the resolution machine-learning model identifies one or more responses that are likely to resolve the query, wherein the one or more responses are associated with a relevance value assigned based on historical queries and responses;
automatically responding to the query with a particular response that is likely to resolve the query from the one or more responses, wherein the particular response is selected based on the relevance value; and
instantiating an autonomous software agent configured to provide the particular response as a response to other queries.

2. The computer-implemented method of claim 1, wherein the query-detection machine-learning model and/or the resolution machine-learning model include a decision tree that is a predictive model, and wherein the response is determined using one or more input variables associated with the query.

3. The computer-implemented method of claim 1, wherein the input is parsed using natural language.

4. The computer-implemented method of claim 1, wherein the query-detection machine-learning model and/or the resolution machine-learning model include an algorithm that is trained using prior queries and responses.

5. The computer-implemented method of claim 1, wherein the query-detection machine-learning model and/or the resolution machine-learning model include machine logic that identifies terms, and wherein the identified terms are used to generate a narrative flow.

6. The computer-implemented method of claim 1, wherein the query-detection machine-learning model and/or the resolution machine-learning model use an API to facilitate communication between two systems.

7. The computer-implemented method of claim 1, wherein the query-detection machine-learning model and/or the resolution machine-learning model determine the one or more responses to a query using one or more input variables from the query.

8. The computer-implemented method of claim 1, wherein executing the resolution machine-learning model further comprises:
assigning confidence values to the one or more responses; and
selecting, from the one or more responses, a particular response that is likely to resolve the query based on the confidence values.

9. A system, comprising:
one or more data processors; and
a non-transitory computer readable storage medium containing instructions which when executed on the one or more data processors, cause the one or more data processors to perform operations including:
monitoring an enterprise system by using an API to interact with enterprise data corresponding to user interactions with the enterprise system, wherein the user interactions have corresponding user interaction data, wherein the system includes a query-detection machine-learning model and a resolution machine-learning model, and wherein the query-detection machine-learning model is a distinct machine-learning model from the query-detection machine-learning model;
integrating the enterprise data and the user interaction data into a response query-detection machine-learning model;
detecting input to the enterprise system;
identifying a query in the input using the query-detection machine-learning model and the input;
executing a resolution machine-learning model using the query, wherein the resolution machine-learning model identifies one or more responses that are likely to resolve the query, wherein the one or more responses are associated with a relevance value assigned based on historical queries and responses;
automatically responding to the query with a particular response of the one or more responses, wherein the particular response is selected based on the relevance value; and
instantiating an autonomous software agent configured to provide the particular response as a response to other queries.

10. The system of claim 9, wherein the query-detection machine-learning model and/or the resolution machine-learning model include a decision tree that is a predictive model, and wherein the response is determined using one or more input variables associated with the query.

11. The system of claim 9, wherein the input is parsed using natural language.

12. The system of claim 9, wherein the query-detection machine-learning model and/or the resolution machine-learning model include an algorithm that is trained using prior queries and responses.

13. The system of claim 9, wherein the query-detection machine-learning model and/or the resolution machine-learning model include machine logic that identifies terms, and wherein the identified terms are used to generate a narrative flow.

14. The system of claim 9, wherein the query-detection machine-learning model and/or the resolution machine-learning model use an API to facilitate communication between two systems.

15. The system of claim 9, wherein the query-detection machine-learning model and/or the resolution machine-learning model determine the one or more responses to a query using one or more input variables from the query.

16. The system of claim 9, wherein executing the resolution machine-learning model further comprises:
assigning confidence values to the one or more responses; and
selecting, from the one or more responses, a particular response that is likely to resolve the query based on the confidence values.

17. A computer-program product tangibly embodied in a non-transitory machine-readable storage medium, including instructions configured to cause a data processing apparatus to perform operations including:
monitoring an enterprise system by using an API to interact with enterprise data corresponding to user interactions with the enterprise system, wherein the user interactions have corresponding user interaction data, wherein the non-transitory machine-readable storage medium includes a query-detection machine-learning model and a resolution machine-learning model, and wherein the query-detection machine-learning model is a distinct machine-learning model from the query-detection machine-learning model;

integrating the enterprise data and the user interaction data into a query-detection machine-learning model;

detecting input to the enterprise system;

identifying a query in the input using the query-detection machine-learning model and the input;

executing a resolution machine-learning model using the query, wherein the resolution machine-learning model identifies one or more responses that are likely to resolve the query, wherein the one or more responses are associated with a relevance value assigned based on historical queries and responses;

automatically responding to the query with a particular response of the one or more responses, wherein the particular response is selected based on the relevance value; and instantiating an autonomous software agent configured to provide the particular response as a response to other queries.

18. The computer-program product of claim 17, wherein the query-detection machine-learning model and/or the resolution machine-learning model include a decision tree that is a predictive model, and wherein the response is determined using one or more input variables associated with the query.

19. The computer-program product of claim 17, wherein the input is parsed using natural language.

20. The computer-program product of claim 17, wherein the query-detection machine-learning model and/or the resolution machine-learning model include an algorithm that is trained using prior queries and responses.

21. The computer-program product of claim 17, wherein the query-detection machine-learning model and/or the resolution machine-learning model include machine logic that identifies terms, and wherein the identified terms are used to generate a narrative flow.

22. The computer-program product of claim 17, wherein the query-detection machine-learning model and/or the resolution machine-learning model use an API to facilitate communication between two systems.

23. The computer-program product of claim 17, wherein the query-detection machine-learning model and/or the resolution machine-learning model determine the one or more responses to a query using one or more input variables from the query.

24. The computer-program product of claim 17, wherein executing the resolution machine-learning model further comprises:

assigning confidence values to the one or more responses; and selecting, from the one or more responses, a particular response that is likely to resolve the query based on the confidence values.

* * * * *